(12) United States Patent
Patwardhan et al.

(10) Patent No.: US 9,568,215 B2
(45) Date of Patent: Feb. 14, 2017

(54) SOLAR CENTRAL RECEIVER SYSTEM EMPLOYING COMMON POSITIONING MECHANISM FOR HELIOSTATS

(76) Inventors: Ravindra Patwardhan, Pune (IN); Rajeev Pandit, Parkland, FL (US)

( * ) Notice: Subject to any disclaimer, the term of this patent is extended or adjusted under 35 U.S.C. 154(b) by 1556 days.

(21) Appl. No.: 12/798,847

(22) Filed: Apr. 13, 2010

(65) Prior Publication Data

US 2011/0000515 A1 Jan. 6, 2011

Related U.S. Application Data

(60) Provisional application No. 61/277,032, filed on Sep. 21, 2009.

(30) Foreign Application Priority Data

Jul. 1, 2009 (IN) .......................... 1545/MUM/2009
Aug. 10, 2009 (IN) .......................... 1545/MUM/2009

(51) Int. Cl.
*H01L 35/00* (2006.01)
*H01L 37/00* (2006.01)
(Continued)

(52) U.S. Cl.
CPC .. *F24J 2/38* (2013.01); *F24J 2/12* (2013.01); *F24J 2/18* (2013.01); *F24J 2/5264* (2013.01); *F24J 2/541* (2013.01); *F24J 2/5424* (2013.01); *H02S 20/10* (2014.12); *H02S 20/30* (2014.12); *H02S 20/32* (2014.12); *H02S 40/20* (2014.12); *H02S 40/22* (2014.12); *F24J 2/07* (2013.01); *F24J 2002/108* (2013.01); *F24J 2002/109* (2013.01); *F24J 2002/385* (2013.01);
(Continued)

(58) Field of Classification Search
CPC ................... F24J 2/07; F24J 2/12; F24J 2/18; F24J 2/38; F24J 2/541; F24J 2/5264; F24J 2/5424; F24J 2002/109; H01L 31/0422; H01L 31/0522; H01L 31/058; Y02E 10/41; Y02E 10/42; Y02E 10/46; Y02E 10/47; Y02E 10/52; Y02E 10/58; H02S 40/00; H02S 40/20; H02S 40/22; H02S 20/00; H02S 20/10; H02S 20/30; H02S 20/32
USPC ........ 136/206, 246, 251, 259; 126/684, 561, 126/606, 601, 569
See application file for complete search history.

(56) References Cited

U.S. PATENT DOCUMENTS 4,317,031 A * 2/1982 Findell ........................ 250/203.4
5,617,843 A * 4/1997 Erwin ........................... 126/681
(Continued)

*Primary Examiner* — Lindsey Bernier

(57) ABSTRACT

A solar central receiver system employing common positioning mechanism for heliostats relates to a system of concentrating and harvesting solar energy. The heliostats of said system are positioned like facets of a Fresnel type of reflector. The heliostats are placed in arrays, wherein each array has a common positioning mechanism. The common positioning mechanism synchronously maneuvers the arrays of heliostats in altitudinal and/or azimuthal axis for tracking an apparent movement of the sun. The common positioning mechanism is employed for synchronously orienting said heliostats with respect to a stationary object and the sun such that incident solar radiation upon said heliostats is focused upon said stationary object from dawn to dusk. Subsequent to each said orientation of said heliostats, collective disposition of said heliostats always forms an arrangement that is capable of reflecting and thereby focusing incident solar radiation upon said stationary object.

23 Claims, 15 Drawing Sheets

(51) Int. Cl.
  *H02N 6/00*     (2006.01)
  *H01L 31/042*   (2014.01)
  *H01L 31/00*    (2006.01)
  *F24J 2/00*     (2014.01)
  *F24J 2/38*     (2014.01)
  *F24J 2/08*     (2006.01)
  *F24J 2/10*     (2006.01)
  *H02S 20/30*    (2014.01)
  *H02S 20/10*    (2014.01)
  *H02S 40/20*    (2014.01)
  *H02S 40/22*    (2014.01)
  *F24J 2/12*     (2006.01)
  *F24J 2/18*     (2006.01)
  *F24J 2/52*     (2006.01)
  *F24J 2/54*     (2006.01)
  *F24J 2/07*     (2006.01)

(52) U.S. Cl.
  CPC    *F24J 2002/5451* (2013.01); *F24J 2002/5462* (2013.01); *F24J 2002/5468* (2013.01); *Y02E 10/41* (2013.01); *Y02E 10/42* (2013.01); *Y02E 10/46* (2013.01); *Y02E 10/47* (2013.01); *Y02E 10/52* (2013.01); *Y02E 10/58* (2013.01)

(56) References Cited

U.S. PATENT DOCUMENTS

| | | | |
|---|---|---|---|
| 6,603,069 B1 * | 8/2003 | Muhs et al. | 136/246 |
| 2003/0169200 A1 * | 9/2003 | Urban et al. | 342/357.06 |
| 2004/0055120 A1 * | 3/2004 | Gillis | 24/459 |

* cited by examiner (VIEW SEEN FROM C)

(SECTION X-Y)

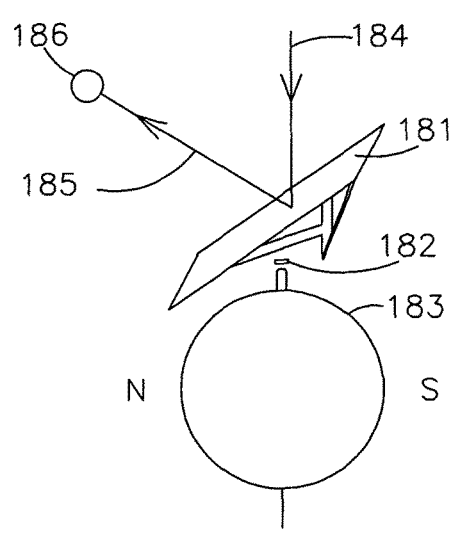
FIG.16A
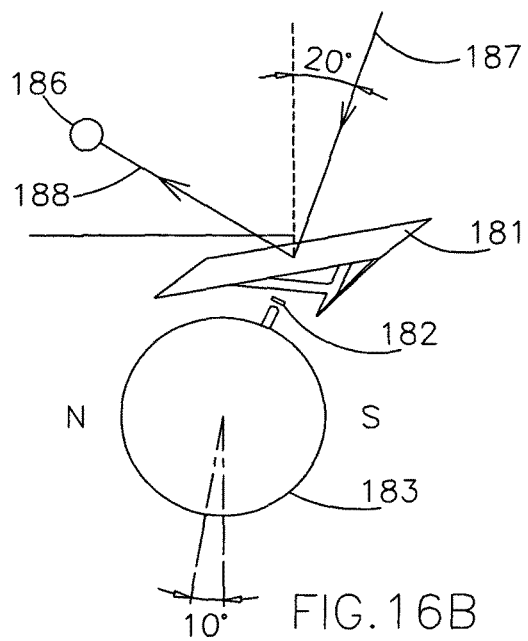
FIG.16B
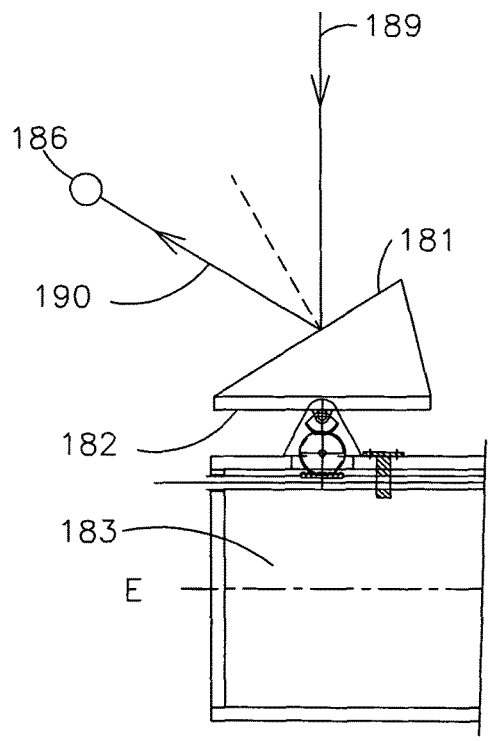
FIG.16C
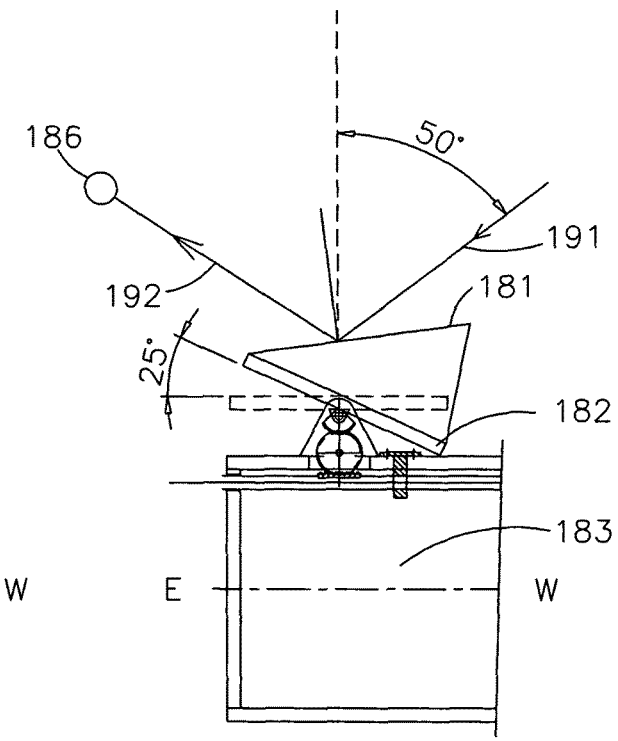
FIG.16D
FIG.16

SOLAR CENTRAL RECEIVER SYSTEM EMPLOYING COMMON POSITIONING MECHANISM FOR HELIOSTATS

RELATED APPLICATIONS

Priority is claimed for US provisional patent application:
An application claiming the benefit under 35 USC 119(e)
U.S. Provisional patent application number: U.S. 61/277,032
Filing date: Sep. 21, 2009
Priority claimed: Yes
Priority is also claimed for two Indian patent applications (foreign patent applications):
1) Provisional Patent Application number: 1545/MUM/2009
Filing date: Jul. 1, 2009
Priority claimed: Yes
Country: IN (India)
2) Nonprovisional Patent Application number: 1545/MUM/2009
Filing date: Aug. 10, 2009
Country: IN (India)
Priority claimed: Yes
All of the aforementioned patent applications are incorporated herein in their entirety by reference.

BACKGROUND OF THE INVENTION

Field of the Invention

A solar central receiver system employing common positioning mechanism for heliostats relates to a system of concentrating and harvesting solar energy. The solar central receiver system utilizes arrays of heliostats, wherein each array has a common positioning mechanism for tracking the apparent diurnal movement of the sun for both altitude and azimuth axes. The common positioning mechanism periodically brings about synchronized orientation of heliostats such that the incident solar radiation is continually focused onto a stationary object from dawn to dusk.

Description of the Related Art

Solar energy has received attention as a clean and environment friendly energy. However, the maximum solar energy density is only about 1000 watts/$m^2$ even when the sun irradiates vertically in a fine day. Therefore, for utilization of solar energy, its efficient concentration is required. The popular solar radiation collection and utilization devices are reflector types. A solar central receiver system (solar furnace) is a dependable efficient producer of large commercial quantities of power. Such a system includes reflectors, tracking system for reflectors, an absorber, and a thermal harvesting system.

Generally, a solar furnace has a tower-mounted central receiver for collection of sunlight and conversion thereof into electricity. The solar radiation is concentrated on to the central receiver by reflection from heliostats spaced about the tower. A solar tracking system aims the heliostats by continually predicting the location of the sun in the sky. Predictions are based on the date, time, longitude and latitude. Using the predicted location of the sun and the position of the central receiver with respect to each heliostat (optical element), azimuth and/or elevation angles are periodically calculated for each heliostat and each heliostat is positioned accordingly. Configuring each heliostat to be individually movable typically requires a large amount of expensive motorized equipment. Each heliostat requires dedicated motors for azimuthal and altitudinal tracking. Besides, each heliostat has to be independently supported by a sturdy pedestal for providing the structural strength. While rotating each heliostat for solar tracking, there is usually a mechanical error in precision that cannot be overcome. Even negligible mechanical errors add up and result in inaccurate aiming. Inaccurate aiming may result in spillage and thermal damage to structures and appliances near the central receiver. Increasing the accuracy and efficiency of heliostats by employing expensive aiming devices significantly increases the plant cost.

A need therefore exists to have a low cost and simple but efficient common positioning mechanism for providing altitudinal as well as azimuthal orientation of arrays of heliostats in a solar central receiver system. An objective of the present invention is to install arrays of heliostats that are synchronously rotatable about altitudinal as well as azimuthal axis by a common positioning mechanism such that the heliostats continue to reflect the sunlight towards a stationary object from dawn to dusk. An objective of the present invention is to employ a common positioning mechanism for arrays of heliostats for both altitude and azimuth axis orientation. Consequently, expensive motorized equipments for configuring individual precise positioning of each heliostat for solar tracking would not be needed.

In conventional heliostats, it is essential to individually control rotation of mirror of each heliostat in accordance with the diurnal movement of the sun. This necessitates individual sensing and alignment devices for heliostats, a state of the art computer for predicting and controlling the required altitudinal and azimuthal rotation of each heliostat, and protecting said computer from heat and dust. This results in an increased cost. A need therefore exists to reduce these extensive sensing, alignment and computing operations. Therefore the objective of the present invention is to have a common positioning mechanism, wherein prediction of altitudinal and/or azimuthal rotation of any heliostat would suffice to predict the altitudinal and or azimuthal rotation of the entire respective array of heliostats or all the heliostats of the heliostat field. In the present invention, arrays of heliostats track the sun synchronously, which largely simplifies the control system compared to the conventional multi-dimension tracking equipment. Furthermore, expensive alignment equipment for each optical element (heliostat) and obligatory sturdy pedestal for each optical element could be avoided.

In addition, reflector mirror of a heliostat assembled on a conventional pedestal is like a sail ready to fly off when the wind gets underneath it. The force exerted on reflecting surfaces of heliostats by a gust of wind is large and will be dozens of times larger on the bearing points of the supporting pedestals. Hence it is an objective of the present invention to utilize arrays of heliostats on rotatable shafts and to eliminate the need of individual sturdy pedestals. Being low-level arrays, the heliostats of the present invention are not significantly exposed to wind loads and consequently the structural problems are greatly reduced. The position of heliostats close to the ground has an advantage of reduced wind velocity. Furthermore, packing the heliostats in horizontal plane helps to attenuate the wind force from row to row.

The present invention either eliminates or reduces the required number of motors, gearboxes, hydraulic pistons, hoses, other activators, computing systems and massive supports for the heliostats as is essential for the operation of conventional solar central receiver systems. This advantageously reduces the cost and complexity. Thus, the rationale of the present invention is to provide many advantages and novel features that are not anticipated or implied by any of the prior art.

BRIEF SUMMARY OF THE INVENTION

A solar central receiver system employing common positioning mechanism for heliostats relates to a system of concentrating and harvesting solar energy. Said system utilizes arrays of heliostats, wherein each array has a common positioning mechanism for azimuthal as well as altitudinal solar tracking. The common positioning mechanism provides a synchronized orientation for each array of heliostats or all the heliostats of the heliostat field such that each heliostat reflects the incident sunlight onto a stationary object from dawn to dusk. Said stationary object may be a central receiver or a collecting reflector or collecting reflectors or a collimating reflector.

The heliostat field of the present invention consists of flat or curved light reflecting heliostats and a tower mounted central receiver for absorbing the reflected solar radiation. Alternatively a collecting reflector or collecting reflectors are used instead of said central receiver such that the focused solar radiation delivered by said heliostats on said collecting reflector or collecting reflectors is further focused on a receiver or receivers respectively. Or a collimating reflector is used instead of said collecting reflector such that the focused solar radiation delivered by said heliostats on said collimating reflector is collimated and reflected on a light pipe.

Pluralities of rotatable shafts are provided for mounting arrays of heliostats. Rotatable shafts are positioned horizontally either in east west direction or north-south direction, at same height, and rotatable about a first rotation axis that is horizontal and in east west direction or horizontal and in north-south direction. When rotatable shafts are positioned horizontally in north south direction, rotation of rotatable shafts track the apparent altitudinal movement of the sun. And when rotatable shafts are positioned horizontally in east west direction, rotation of rotatable shafts track the apparent azimuthal movement of the sun. A plurality of drive means provides synchronous rotation of rotatable shafts such that arrays of heliostats mounted on said rotatable shafts synchronously rotate about a first rotation axis. An array of mounting means is provided for mounting an array of heliostats over each rotatable shaft. Each said mounting means is provided in a manner which permits individual pivotal movement of the mounted heliostat with respect to the rotatable shaft about a second rotation axis that is perpendicular to said first rotation axis. Each rotatable shaft supports a rotation mechanism to drive the mounted heliostats to rotate about said second rotation axis. Heliostats of said heliostat array mounted on respective said rotatable shaft are linked mechanically so as to be pivotably rotatable in synchronism. When rotatable shafts are positioned horizontally in north south direction, individual pivotal movement of said heliostats about said second rotation axis tracks the azimuthal movement of the sun. And when rotatable shafts are positioned horizontally in east west direction, individual pivotal movement of said heliostats about said second rotation axis tracks the altitudinal movement of the sun.

Like precisely positioned facets of a Fresnel type reflector, each heliostat, according to its location in the heliostat field, is precisely positioned on a respective mount. Heliostats are synchronously maneuverable in altitude and/or azimuth axis. The common positioning mechanism provides a periodic synchronized orientation of all the heliostats of the heliostat field such that each heliostat continues to reflect the incident sunlight onto a stationary object from dawn to dusk. Subsequent to each synchronized reorientation, collective disposition of all the heliostats of the heliostat field always forms an arrangement that is capable of reflecting and thereby focusing entire incident solar radiation on to said stationary object.

BRIEF DESCRIPTION OF SEVERAL VIEWS OF THE DRAWINGS

2) FIG. 2 schematically depicts a top view of a huge paraboloid concentrator that is hypothetically cut into numerous small reflective segments 3)

Figure 6:
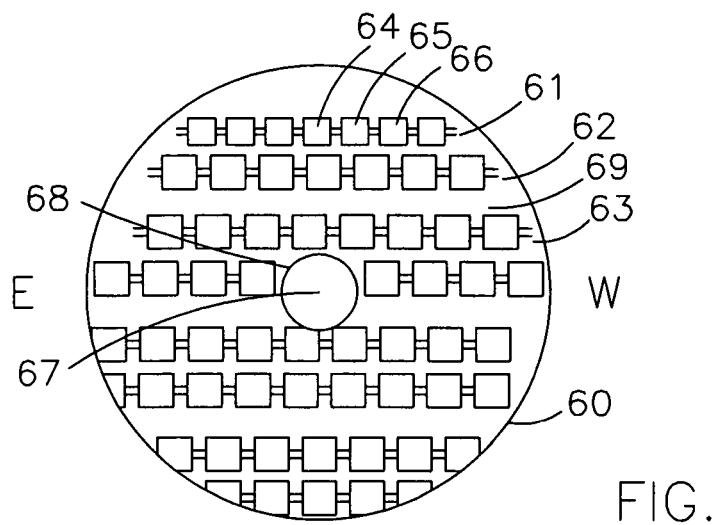

6) FIG. 6 schematically illustrates a top view showing layout of arrays of heliostats in a circular heliostat field.

Figure 7:
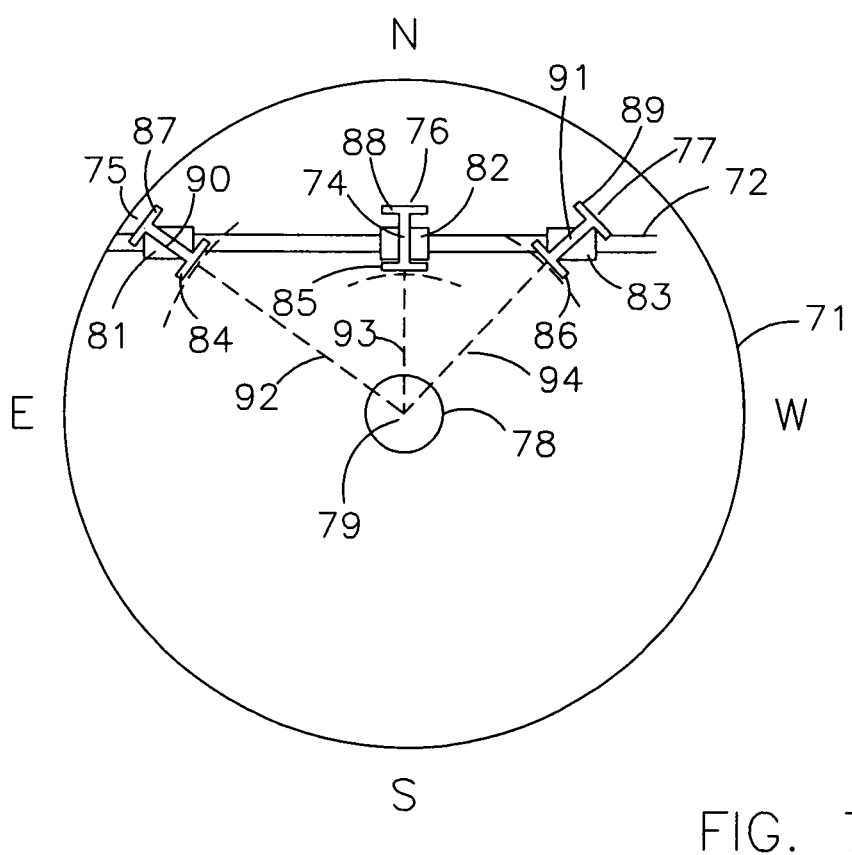

7) FIG. 7 schematically shows a top view of the heliostat field depicting the characteristic positioning of the H shaped brackets.

Figure 8:
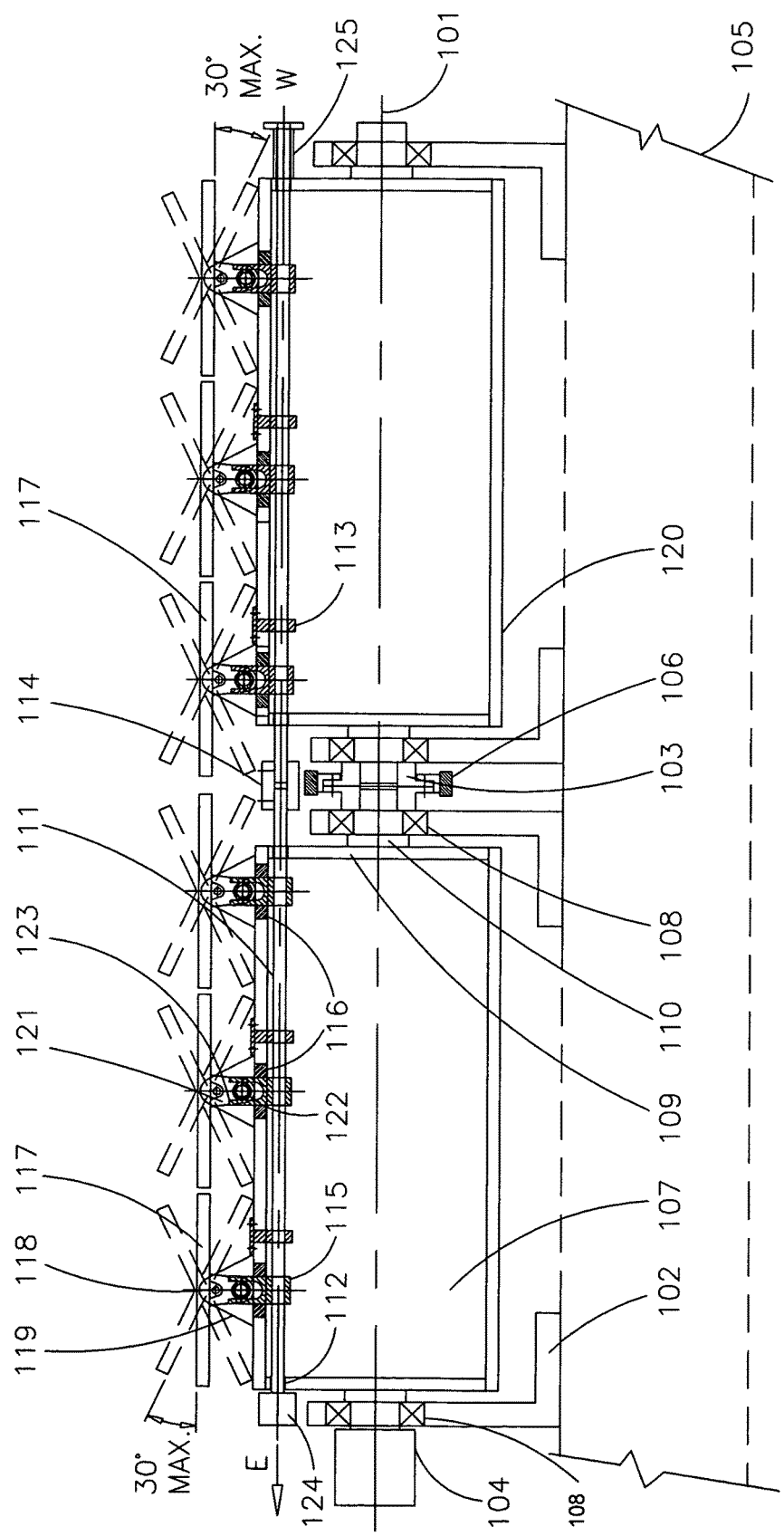

8) FIG. 8 depicts a slotted link and pusher mechanism for driving an array of pivotably rotatable heliostats to synchronously rotate for tracking the apparent motion of the sun in the sky.

Figure 9:
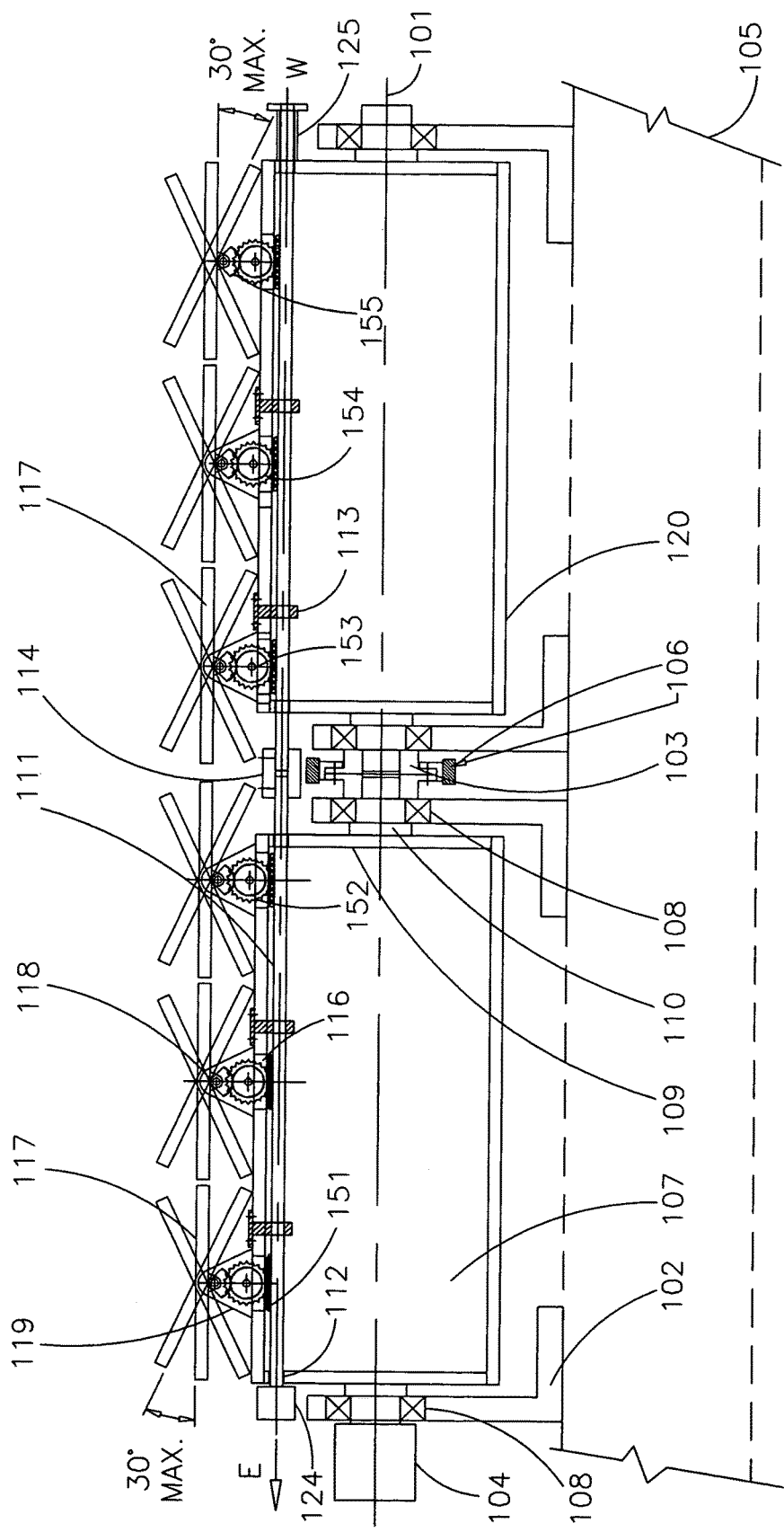

9) FIG. 9 depicts a chain sprocket and gear wheel transmission mechanism for driving an array of pivotably rotatable heliostats to synchronously rotate for tracking the apparent motion of the sun in the sky.

Figure 10:
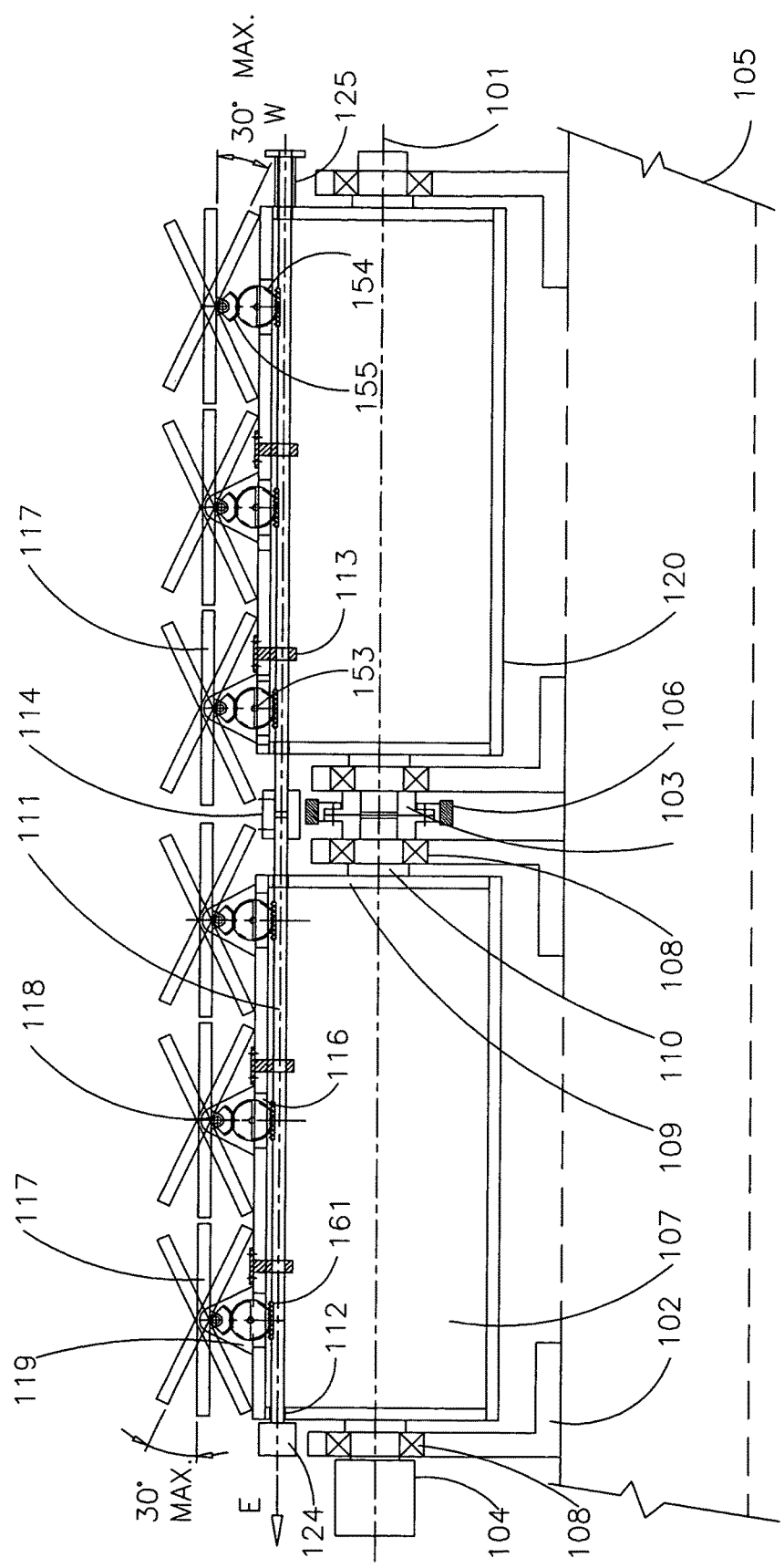

10) FIG. 10 depicts a rack and pinion and gear transmission mechanism for driving an array of pivotably rotatable heliostats to synchronously rotate for tracking the apparent motion of the sun in the sky.

Figure 11:
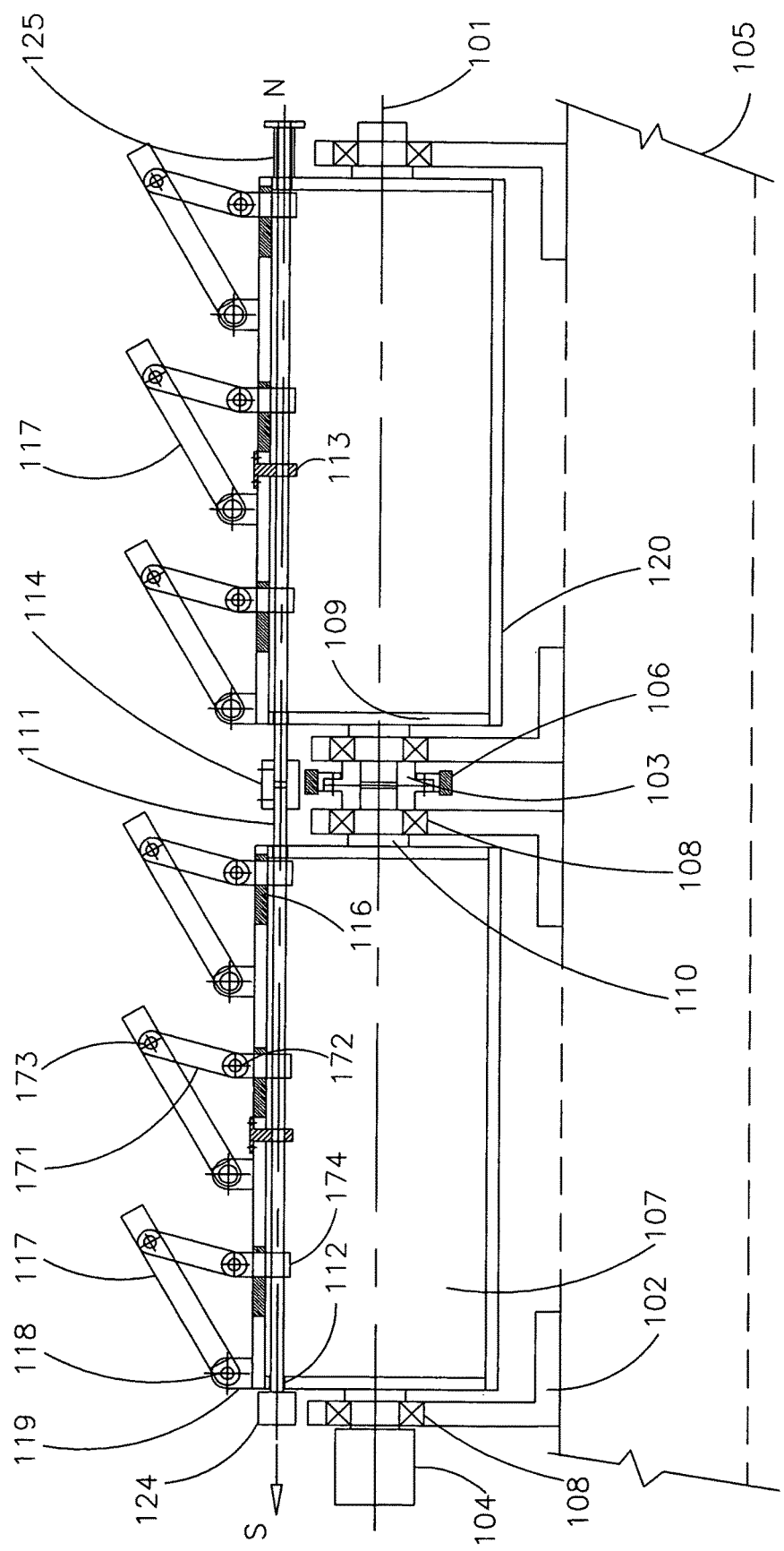

11) FIG. 11 depicts a composite link mechanism consisting of link having rotational and linear movement for driving an array of pivotably rotatable heliostats to synchronously rotate for tracking the apparent motion of the sun in the sky.

Figure 12:
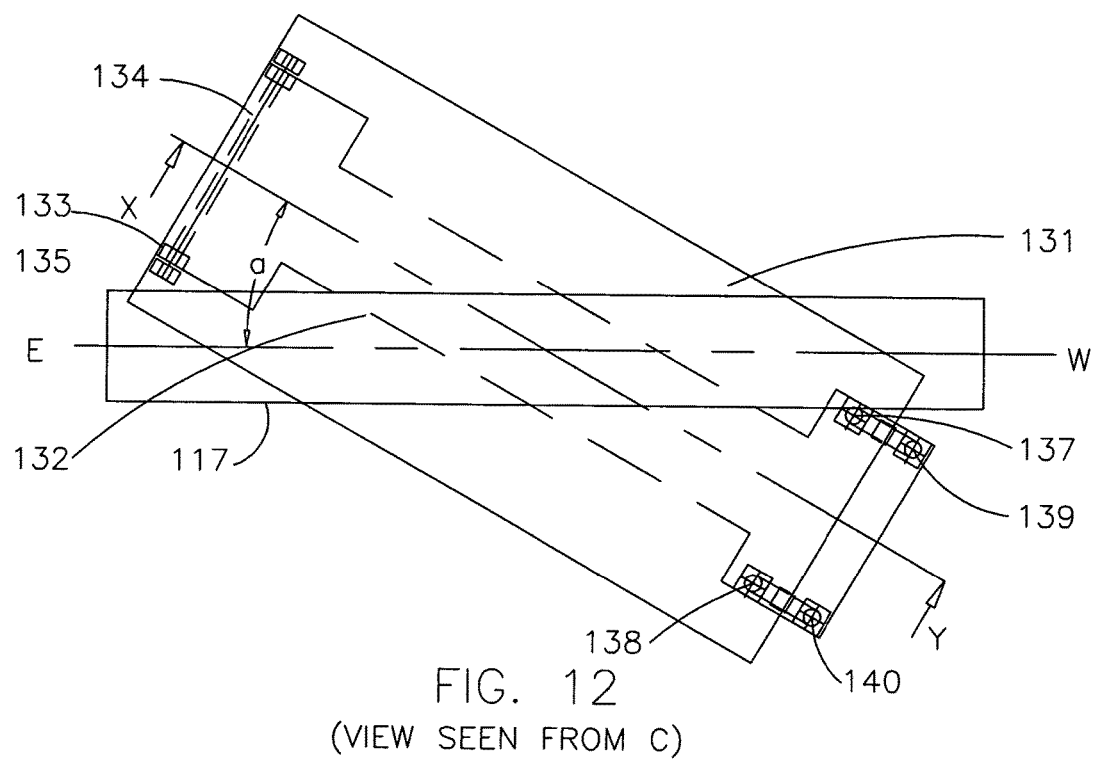

12) FIG. 12 shows a plan view of the fixing arrangement of heliostats on respective H shaped brackets.

Figure 13:
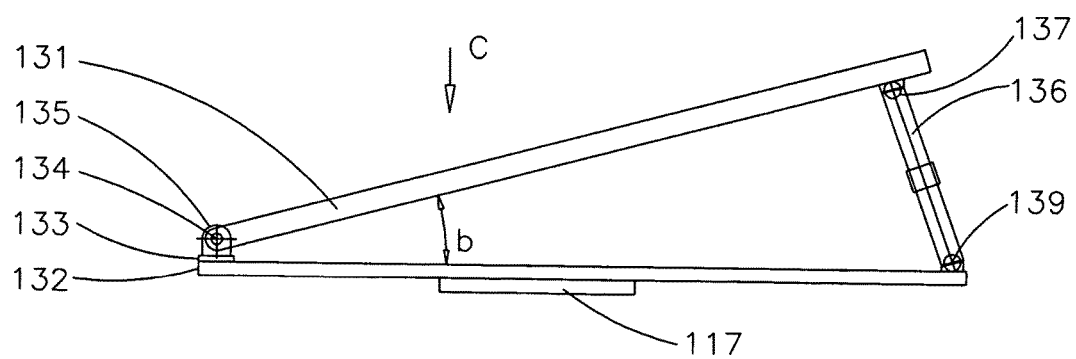

13) FIG. 13 is a cross section along line x-y of said plan view as shown in FIG. 12, and depicts a fixedly positioned inclined heliostat.

Figure 14:
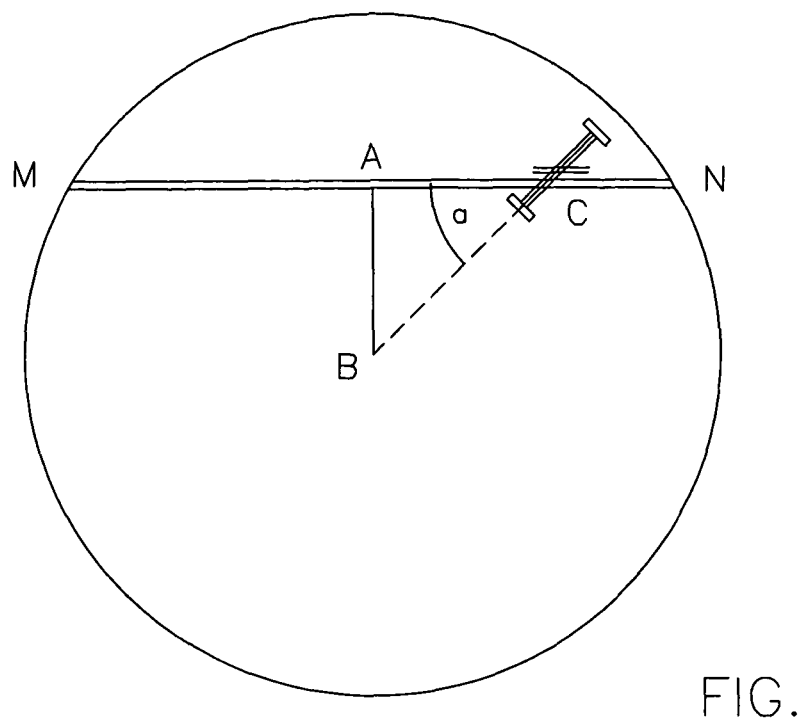

14) FIG. 14 depicts a scheme for determining the angle for positioning of an H shaped bracket over respective support for required orientation of respective heliostat.

Figure 15:
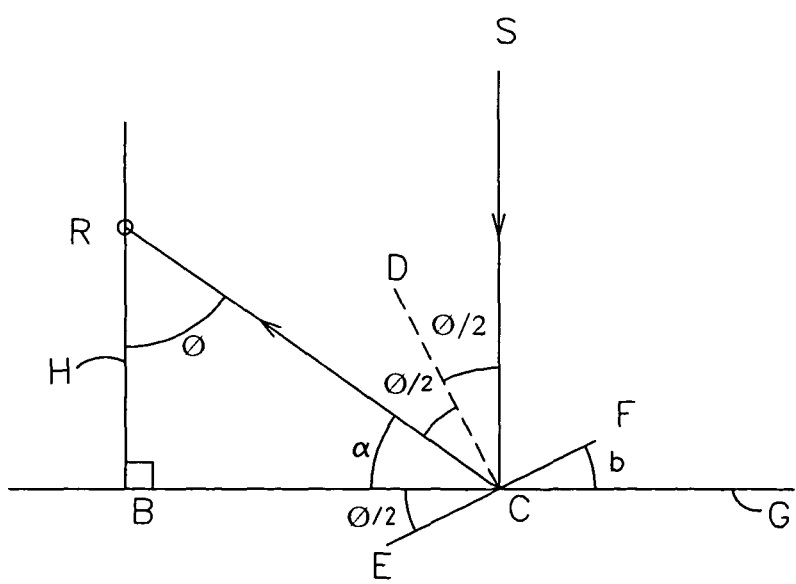

15) FIG. 15 depicts a scheme for determining the angle of inclination of a heliostat for positioning over respective H shaped bracket for required disposition of said heliostat.

16) FIG. 16 schematically depicts the pattern of rotation of heliostats about the first rotation axis and the second rotation axis for tracking the apparent azimuthal and altitudinal movement of the sun.

Figure 17:
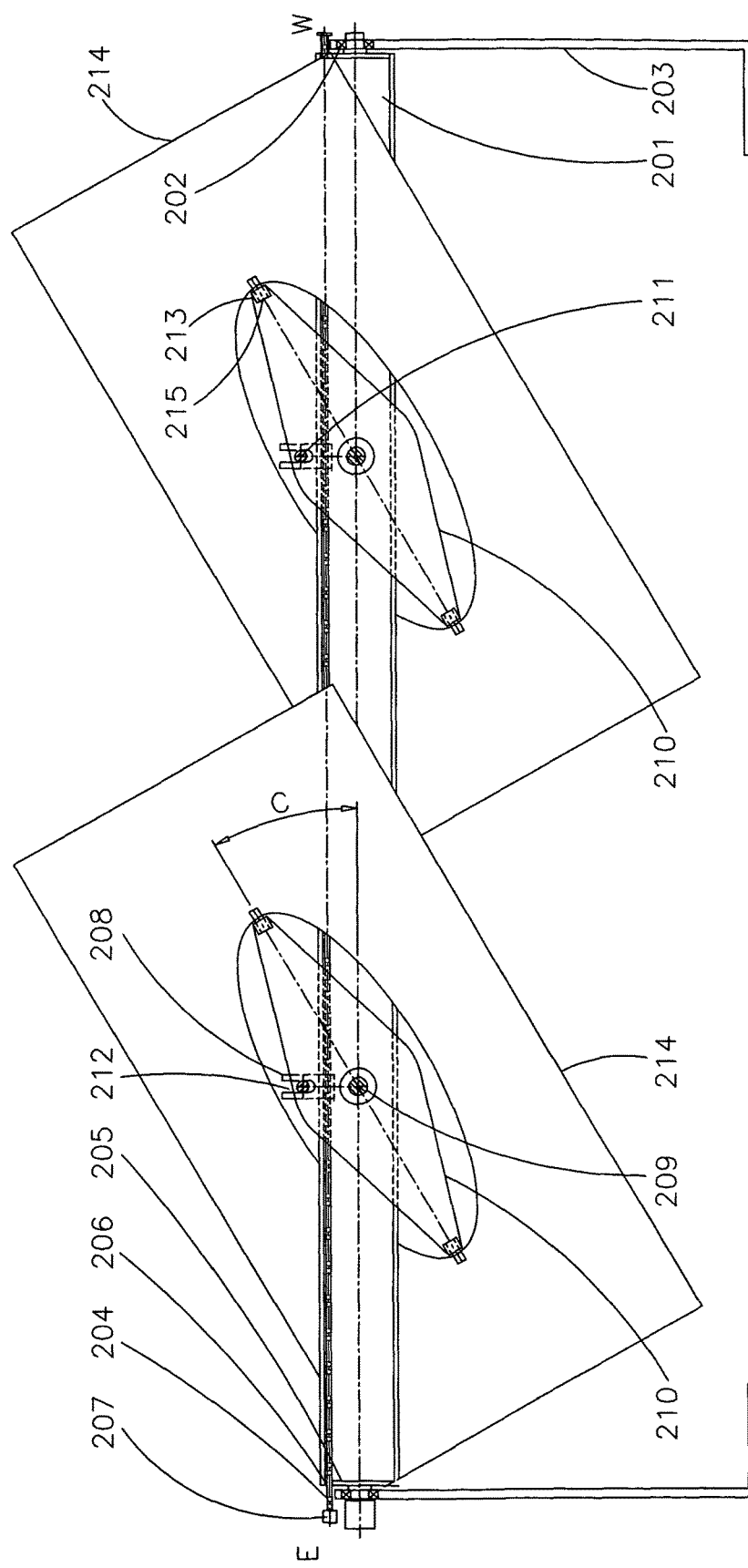

17) FIG. 17 schematically depicts another embodiment, wherein the heliostats move around their centers such that there is no radius of rotation due to their required proper fitment over rotatable shafts.

Figure 18:
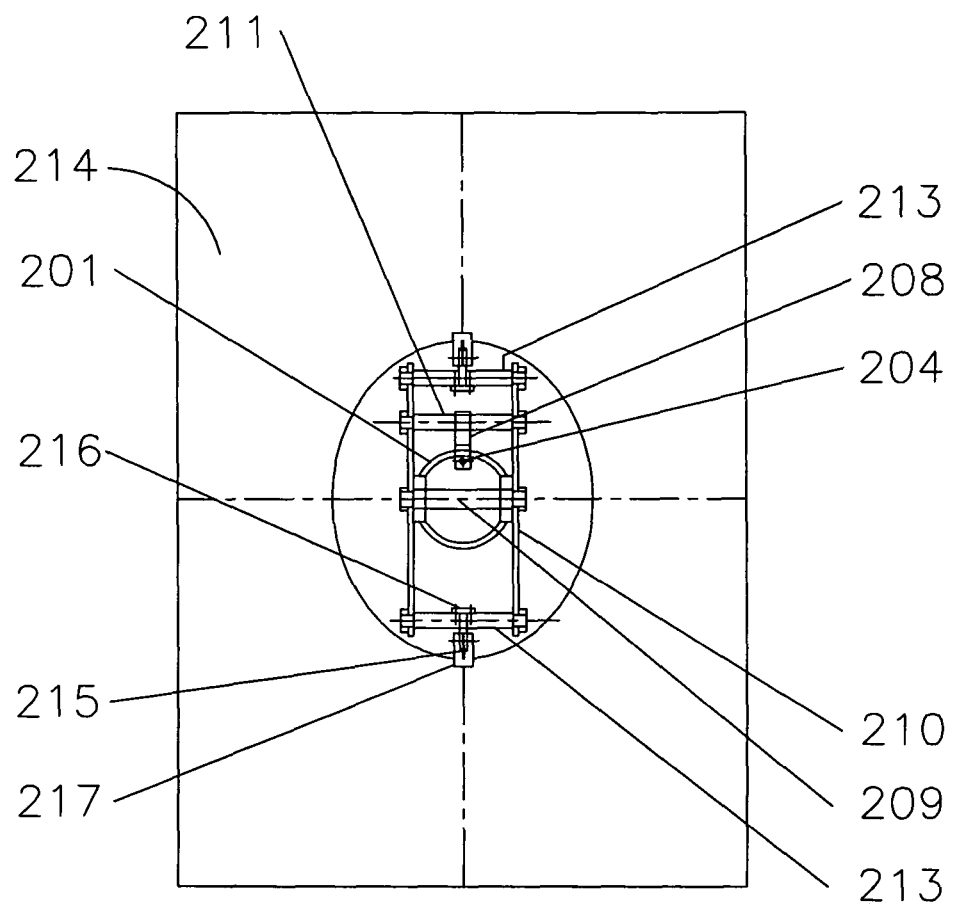

18) FIG. 18 schematically depicts a sectional view of construction of the embodiment as depicted in FIG. 17, wherein the heliostats move around their centers to track the apparent motion of the sun in the sky.

Figure 19:
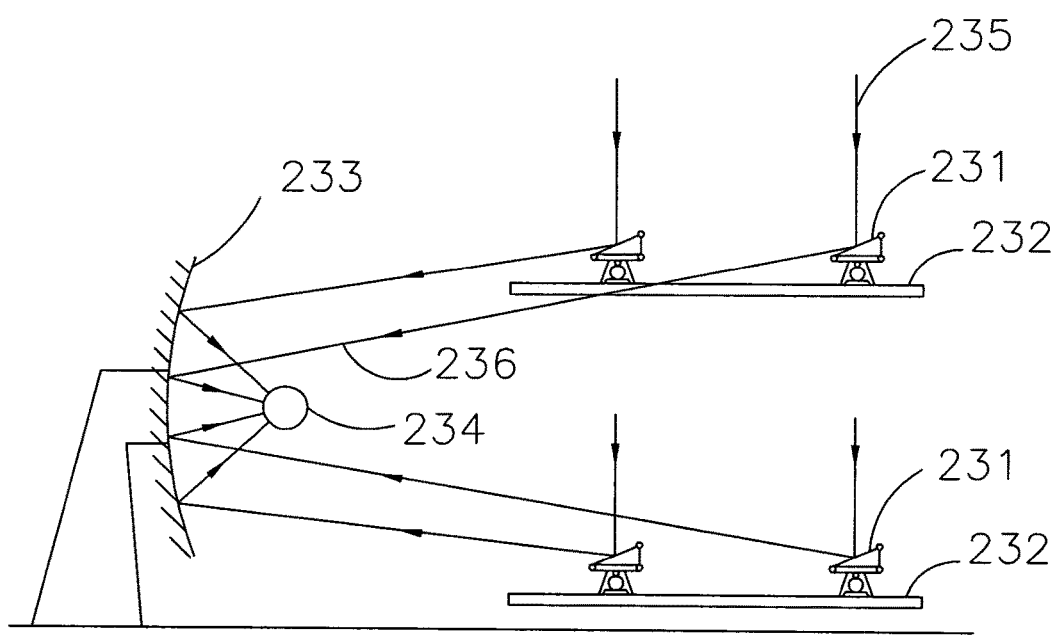

19) FIG. 19 depicts yet another embodiment of solar central receiver system employing common positioning mechanism for heliostats having a single collecting reflector for further concentrating the focused radiation delivered from the heliostat field.

Figure 20:
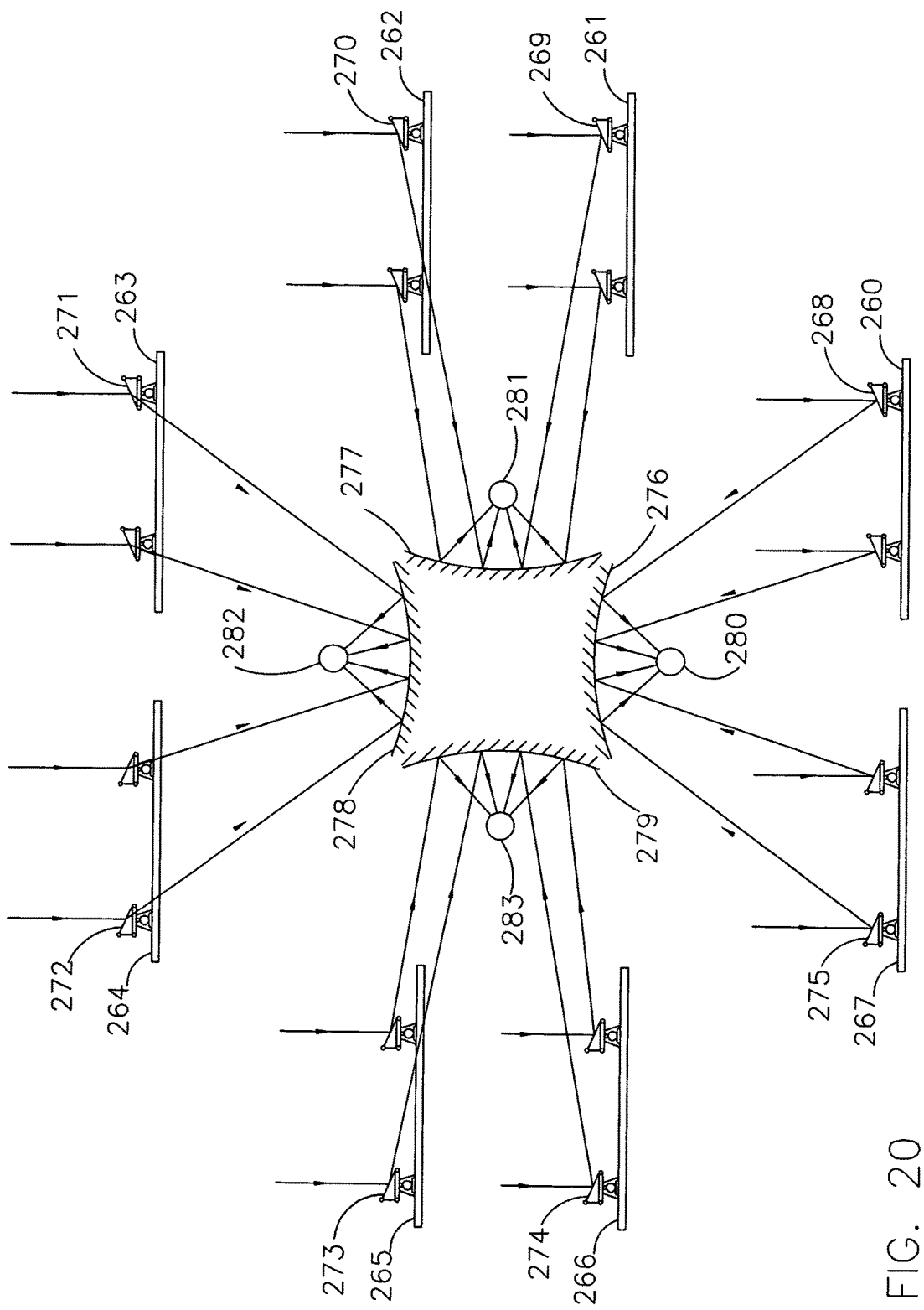

20) FIG. 20 depicts yet another embodiment of solar central receiver system employing common positioning mechanism for heliostats having collecting reflectors for further concentrating the focused radiation delivered from the heliostat field.

Figure 21:
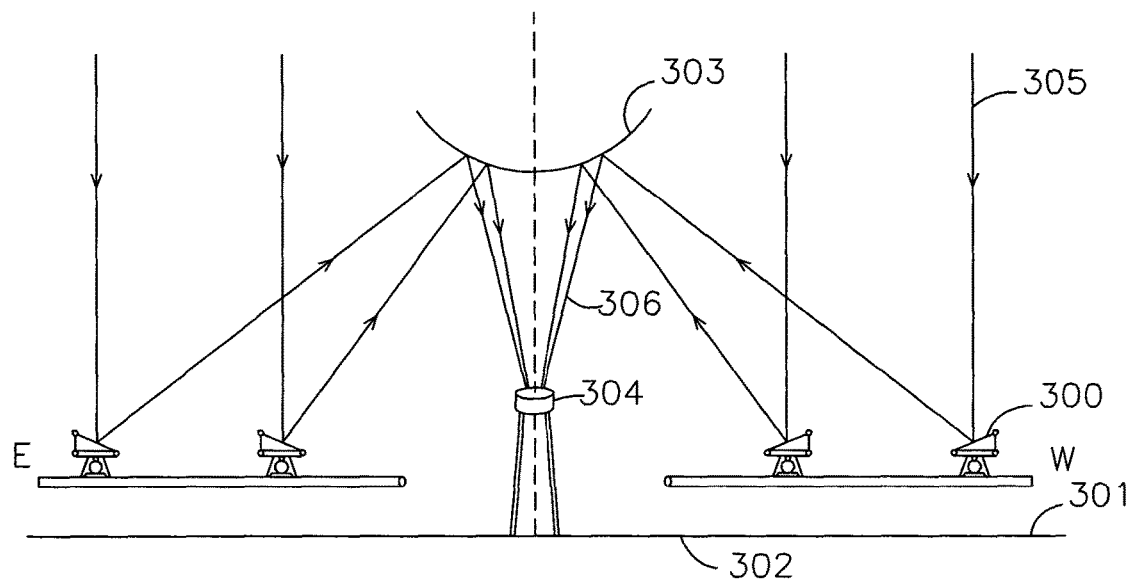

21) FIG. 21 depicts yet another embodiment of solar central receiver system employing common positioning mechanism for heliostats having a tower mounted collecting reflector for further concentrating the focused radiation delivered from the heliostat field.

Figure 22:
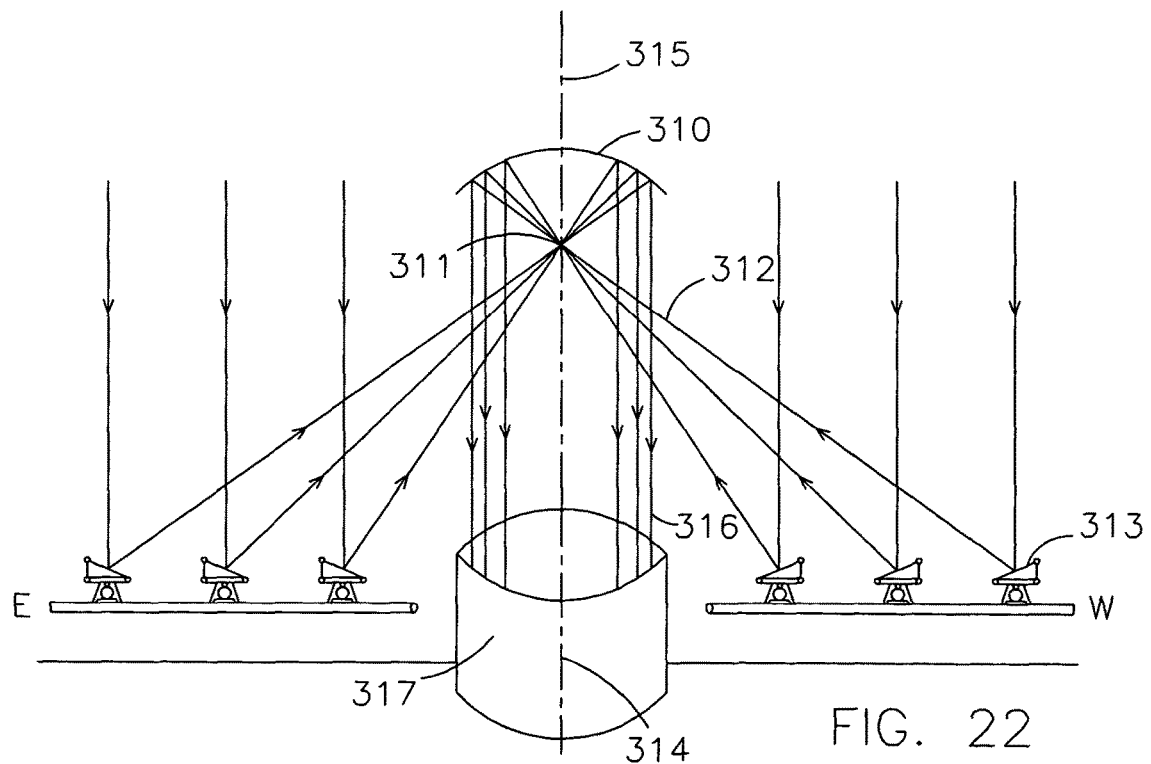

22) FIG. 22 depicts yet another embodiment of solar central receiver system employing common positioning mechanism for heliostats having a tower mounted collimating reflector for collimating the focused radiation delivered from the heliostat field.

DETAILED DESCRIPTION OF THE INVENTION

Concentrated solar power technologies use solar tracking optical elements to concentrate solar radiation. Solar radiation is collected and concentrated to a higher intensity at its point of use. Generally, the final destination of the concentrated solar radiation is referred to as a receiver. Two-dimensional concentrators utilize Sun-tracking, linear parabolic trough collectors that focus solar radiation onto steel tubes through which a heat transfer fluid circulates. To achieve higher concentration of incident solar radiation, three-dimensional concentrators like solar tracking parabolic (paraboloid) dish reflectors are required. This approach has been applied to dishes of up to about ten meters in diameter. However, when the size of a parabolic concentrator becomes larger, it becomes increasingly difficult to build it with the requisite precision and even more difficult to track it for the apparent altitude and azimuth motion of the sun.

A solar furnace is a dependable efficient producer of large commercial quantities of power. It includes reflectors, tracking systems for reflectors, an absorber, and a thermal harvesting system.

A lot of attempts have been made to reduce the cost of the solar furnaces by introducing ganged heliostats. In the known art, common positioning mechanism is employed either for altitude axis rotation or azimuth axis rotation. The present invention discloses a novel common positioning mechanism for heliostats for both altitude and azimuth axis rotation! To elucidate the practicability and functionality of such an innovative common positioning mechanism, a concept of a 'dynamic flattened manifestation of a huge paraboloid concentrator' is put forward.

A paraboloid (parabolic) concentrator is a reflective device that concentrates electromagnetic radiation to a common focal point. Since the solar radiation can be focused, a paraboloid concentrator is regarded as most appropriate to collect and concentrate the solar energy. As the size of a parabolic concentrator enlarges, it becomes increasingly difficult to build it with the requisite precision and to track it for altitudinal and azimuthal motion of the sun. Nevertheless, even for a humongous (huge) paraboloid concentrator, a dynamic flattened manifestation is possible that can track the altitudinal and azimuthal motion of the sun!

As already stated, the functioning of the present invention is based on the concept of a 'dynamic flattened manifestation of a huge paraboloid concentrator'. To elaborate this concept, consider a paraboloid concentrator having a huge diameter at its periphery, say a diameter of 250 meters. For the description purpose, it is assumed that such a huge paraboloid concentrator is positioned on a flat horizontal ground, wherein the ground is tangential to the center of the huge paraboloid concentrator and the solar radiation is vertically and paraxially incident.

Figure 2:
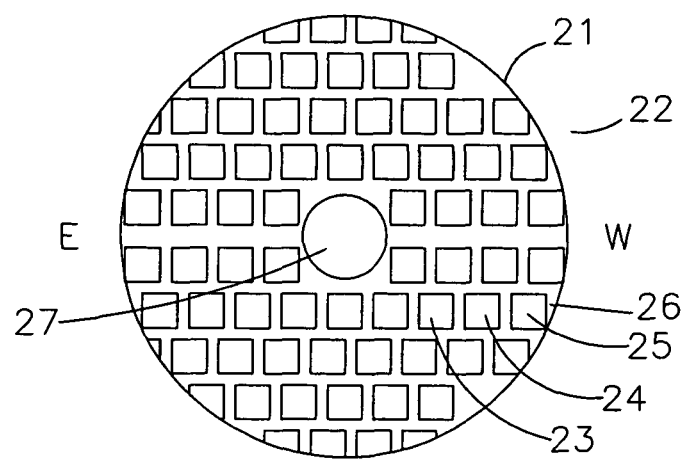
Figure 3:
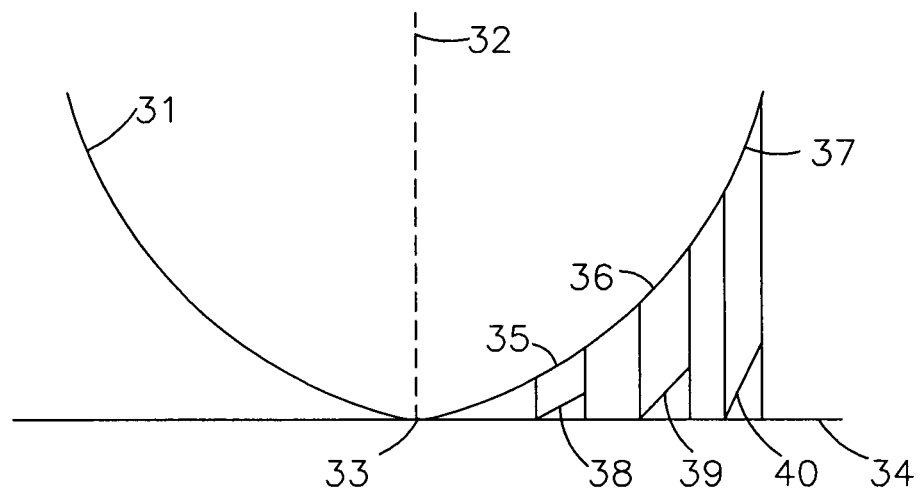
FIG. 3 depicts the first step of the scheme of reducing a huge paraboloid concentrator into its flattened manifestation.

Suppose the continuous surface of the huge paraboloid concentrator is hypothetically cut into numerous small segments, then such hypothetical segments would evidently have the same orientation, inclination and disposition but would have discontinuities between them. FIG. 2 schematically depicts a top view of a circular surface 21 of a huge paraboloid concentrator 22. Said concentrator 22 is seen hypothetically cut into numerous small discrete reflective segments. Said segments, thus formed, surround the center 27 of said huge paraboloid concentrator, wherein said segments naturally have the same orientation and inclination. As an illustration, the segments 23, 24, 25 are depicted to be aligned in east west direction in an array 26. FIG. 3 schematically depicts such hypothetically cut discrete segments 35, 36, and 37. Perpendicular lines are drawn from said segments on the ground 34. From each medial point, where the perpendicular lines meet the ground, parallel lines 38, 39 and 40 are drawn parallel to respective said segments 35, 36 and 37. The parallel lines represent juxtaposed reflective segments that are juxtaposed to the ground 34. The juxtaposed reflective segments have the same angle of inclination as that of the segments 35, 36 and 37. Such juxtaposed reflective segments form the first step of creating a 'flattened manifestation of the huge paraboloid concentrator'.

To form a flattened manifestation of the huge paraboloid concentrator, the solar radiation reflected off the juxtapoased segments 38, 39, and 40 needs to fall on a fixed target positioned at a desired height in the axial region. Therefore, the angle of inclination of each juxtaposed reflective segment would have to be attuned.

Figure 4:
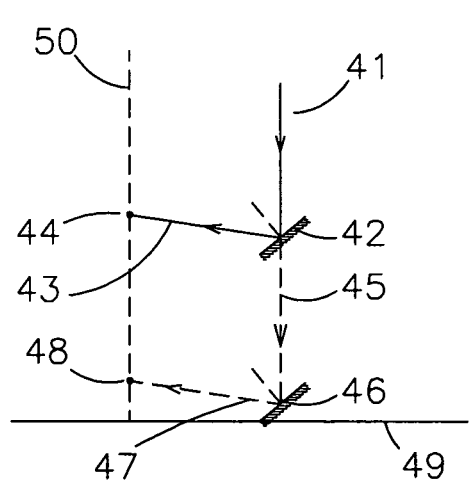
FIG. 4 depicts the changed reflection pattern in juxtaposed segments of the first step of the scheme of reducing the huge paraboloid concentrator into its flattened manifestation.
Figure 5:
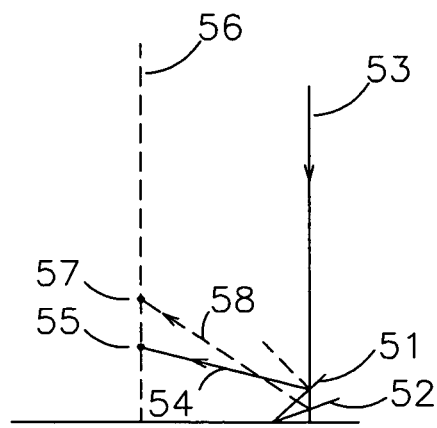
FIG. 5 depicts the requisite attunement of the juxtaposed reflective segments so as to form a flattened manifestation of the huge paraboloid concentrator.

For example as depicted in FIG. 4, a hypothetically cut segment 42 has its juxtaposed reflective segment 46 located near the ground. When a light beam 41 is incident on the segment 42, it would be reflected and would fall on the focal point 44 on the axis 50. If that light beam 41 falls on the juxtaposed reflective segment 46 instead of the hypothetically cut segment 42, it would be reflected (reflected beam 47) towards point 48 located on the axis 50. However, the fixed target like a central receiver may be positioned at a different location on the axis 50. Hence, the angle of inclination of each juxtaposed reflective segment would have to be attuned such that the reflected solar radiation of each juxtaposed reflective segment would fall on a fixed target placed in the axial region at a desired height. FIG. 5 depicts a juxtaposed reflective segment 51 and an attuned juxtaposed reflective segment 52. The incident solar radiation 53, incident on the juxtaposed reflective segment 51, would be reflected at a point 55 located on the axis 56. The fixed target (like a central receiver) may be positioned at a different location on the axis as indicated by numeral 57.

Consequently, the inclination of the juxtaposed reflective segment 51 would have to be attuned such that the reflected light should fall on said fixed target 57. The segment 52 is such an attuned juxtaposed reflective segment, which reflects the incident light on the position of the fixed target depicted by numeral 57.

It is already assumed that the solar radiation is vertically and paraxially incident (Location of the sun is at the zenith). When the entire juxtaposed reflective segments (quasiparaboloid reflective segments) pertinent to the huge paraboloid concentrator are attuned, said huge paraboloid concentrator can be said to be transformed into its 'flattened manifestation related to the location of the sun at zenith'. Such a flattened manifestation is a reflective concentrating device, which may be considered as an analogue of a Fresnel type reflector. In a Fresnel type reflector, optically flat cuts are made at desired angles so as to direct the incident light at a specific locus. Similar to the facets of a Fresnel type reflector, the attuned juxtaposed reflective segments of the present invention are precisely oriented and inclined.

The flattened manifestation of the humongous paraboloid concentrator comprises pluralities of attuned juxtaposed reflective segments. Each attuned juxtaposed reflective segment has an inclination and orientation such that the incident solar radiation is focused on to a fixed target. The inclination and orientation of an attuned juxtaposed reflective segment depends on its location in a heliostat field, the position of the stationary object (for example the position and height of central receiver) on which the incident solar radiation is to be focused, and the location of the sun in the sky. Said precise inclination and orientation of each attuned juxtaposed reflective segment can be mathematically calculated.

Now, to enable such a flattened manifestation of the humongous paraboloid concentrator to track the apparent altitudinal and azimuthal motion of the sun, a 'dynamic flattened manifestation of the humongous paraboloid concentrator' would have to be created.

In a 'dynamic flattened manifestation of a huge paraboloid concentrator', the disposition of all the attuned juxtaposed reflective segments can be periodically oriented with respect to the changing elevational and azimuthal position of the sun. When the attuned juxtaposed reflective segments are solar tracked so as to continue to reflect and focus the incident solar radiation on a stationary object, such solar tracked attuned juxtaposed reflective segments fulfill the criteria of heliostats. Hence, such solar tracked attuned juxtaposed reflective segments are henceforth referred to as heliostats in the present text.

The dynamic flattened manifestation of a huge paraboloid concentrator comprises of a heliostat field consisting of pluralities of rotatable shafts located about a stationary object (fixed target). Arrays of heliostats are mounted on said rotatable shafts. Similar to each attuned juxtaposed reflective segment of a flattened manifestation of a huge paraboloid concentrator, a related heliostat has an analogous inclination and orientation. Like precisely positioned facets of a Fresnel type reflector, according to their locations in the heliostat field heliostats are precisely positioned on respective mounts. In a 'dynamic flattened manifestation of a huge paraboloid concentrator, the disposition of all the precisely positioned heliostats are needed to be oriented with respect to the changing elevational and azimuthal position of the sun. For this purpose a common positioning mechanism is employed to synchronously orient the disposition of said heliostats such that said heliostats continue to focus the incident solar radiation on a fixed target from dawn to dusk.

For the convenience of description, in the detailed description of the invention that follows, it is assumed that the rotatable shafts are positioned horizontally, in east west direction, at about the same height, and rotatable about a first rotation axis that is horizontal and in east west direction. Each rotatable shaft mounts an array of heliostats. Hence, a rotation of a rotatable shaft would orient the over-riding array of heliostats to track the apparent azimuthal movement of the sun.

An array of mounting means is provided for mounting an array of heliostats over each rotatable shaft. Each said mounting means is designed in a manner which permits individual pivotal movement of the mounted heliostat with respect to the rotatable shaft about a second rotation axis that is perpendicular to said first rotation axis. Heliostats of said heliostat array mounted on respective said rotatable shaft are linked mechanically so as to be pivotably rotatable in synchronism. Each rotatable shaft supports a rotation mechanism to drive the mounted heliostats to rotate about said second rotation axis to track the altitudinal movement of the sun.

Thus the common positioning mechanism can implement a synchronous rotation of an array of heliostats or all the heliostats to track the movement of the sun in the altitude and/or azimuth axis.

Now the inclination and orientation of a heliostat depends on its location in a heliostat field, the position of the fixed target (the height of the central receiver) on which the incident solar radiation is to be focused, and the location of the sun in the sky. Here, except for the location of the sun in the sky, the rest of the criteria, which define the inclination and orientation for each heliostat are unchanging. The position of the sun in the sky is the only variable factor. Hence, once the heliostats are positioned with respect to the location of the sun at the zenith, for any other location of the sun in the sky, only the angle of incidence of solar radiation on heliostats would be changed. The changed angle of incident solar radiation would be exactly the same for all the heliostats. Therefore, for any changed location of the sun in the sky, the extent of the changed inclination and orientation in each heliostat would be the same. The common positioning mechanism could implement a synchronous orientation of heliostats to achieve the needed degree of changed inclination and orientation. Therefore, for a changed location of the sun in the sky, when related change is made in the inclination and orientation of each heliostat by the common positioning mechanism, a 'flattened manifestation of said huge paraboloid concentrator is formed related to said changed location of the sun in the sky'.

Suppose heliostats are positioned to form a 'flattened manifestation of a huge paraboloid concentrator related to the location of the sun at zenith'. Said flattened manifestation could be changed to a flattened manifestation for a changed location of the sun in the sky. The common positioning mechanism could implement a simultaneous, synchronous rotation to the same extent about altitude and/or azimuth axis of all the heliostats. Suppose it is assumed that the altitudinal movement of the sun from east to west is 20 degrees. Since the location of heliostats is fixed and the target whereupon the incident solar radiation is to be focused is fixedly located, to track said 20 degrees westward movement of the sun as per the law of reflection each heliostat would have to be rotated westward through 10 degrees. For this purpose, the rotation mechanism that drives the mounted heliostats to rotate about the second rotation axis would have to be implemented. Here, for tracking the altitudinal movement of the sun by 20 degrees, the rotation mechanism would synchronously drive all the heliostats to rotate 10 degrees about said second rotation axis. Similarly, in case of the apparent azimuthal movement of the sun by 20 degrees, each heliostat would have to be rotated through 10 degrees about said first rotation axis. For this purpose, the rotation of rotatable shafts by 10 degrees would re-orient the over-riding arrays of heliostats so as to track the apparent 20 degrees azimuthal movement of the sun.

Thus, for orienting a flattened manifestation of the humongous paraboloid concentrator for a changed location of the sun, the present invention puts forward the scheme of simultaneous and synchronous rotation of all the heliostats to the same extent about altitude and/or azimuth axis so that the reflected solar radiation would continue to fall on a fixed target. Such a reorganizing flattened manifestation of a humongous paraboloid concentrator can be termed as a 'dynamic flattened manifestation of a humongous paraboloid concentrator'.

Various figures, which are included in the specification, depict the schematic representation of certain embodiments and are not meant to portray the actual device. FIG. 6 schematically illustrates a top view of a circular heliostat field 60. The parallel east west oriented rows of rotatable shafts (as denoted by numerals 61, 62, 63 as an exemplification) extend across the entire heliostat field 60. On each said rotatable shaft a plurality of heliostats (as denoted by numerals 64, 65, 66 as an exemplification) are fixedly positioned. For said heliostat field 60, area 68 represents the central area where a tower is erected for mounting a fixed target (central receiver). Reference numeral 67 indicates the central point of said area 60. Said parallel rows of east west oriented rotatable shafts are placed horizontal to the ground plane. The term 'horizontal to the ground plane' is to be understood as designating a notional horizontal plane, which is perpendicular to the vertical solar radiation. If the ground area is not planar and has topographic variations, it may be evened out or made usable by structural and positional adjustments of support structures like pedestal supports and supporting frames such that said rotatable shafts remain horizontal and at the same level. Each row of heliostats (for example, row 61) mounted on a respective rotatable shaft is supported on a linear supporting frame (as depicted in FIG. 8, numeral 105). Bottom chords of the supporting frames are fixed to the ground by anchor penetration. Each two adjacent rows (twins), for example row 61 and 62, are interconnected and are configured to be mounted on a shared support structure for rigidity. An access way 69 is located between each such twin for the movement of people and equipment for maintenance and inspection purposes.

Figure 1:
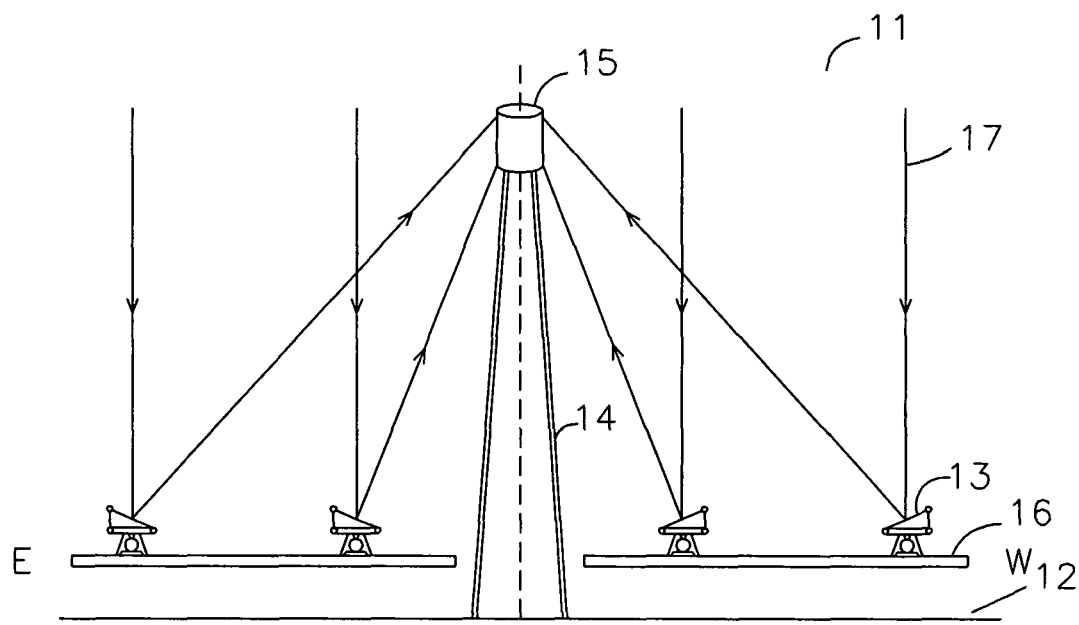
FIG. 1 depicts an embodiment of solar central receiver system employing common positioning mechanism for heliostats where focused solar radiation from heliostats falls on a central receiver.

An embodiment of a solar central receiving system 11 (solar furnace) of the present invention, as depicted in FIG. 1, comprises of a heliostat field 12 enclosing a plurality of linear arrays of heliostats surrounding a centrally located tower 14. Horizontal parallel arrays of rotatable shafts 16 are positioned in east west direction, at about same height, and rotatable about a first rotation axis that is horizontal and in east west direction. Each rotatable shaft has an array of mounting means for mounting an array of heliostats. Horizontal parallel arrays of rotatable shafts can be positioned either in east west direction or in north-south direction, at about same height, and rotatable about a first rotation axis that is horizontal and in east west direction or horizontal and in north-south direction. When rotatable shafts are positioned horizontally in north south direction, rotation of rotatable shafts would track the apparent altitudinal movement of the sun. And when rotatable shafts are positioned horizontally in east west direction, rotation of rotatable shafts would track the apparent azimuthal movement of the sun.

Now, it is already assumed that the rotatable shafts are positioned horizontally and in east west direction, at about the same height, and rotatable about a first rotation axis that is horizontal and in east west direction.

The expanse of land enclosing a plurality of heliostats is referred to as a heliostat field. Conventionally, heliostats are arranged in concentric arcs around a centrally located tower. The present invention does not need nor characterize a solar furnace with arc-shaped layouts. In the present invention, a heliostat field may be of any size and shape like rectangular, circular, oval or polygonal. Linear arrays of heliostats mounted on rotatable shafts are located with respect to a fixed target and occupy the entire heliostat field. Said fixed target (stationary object) may be a central receiver or a collecting mirror or collecting mirrors or a collimating reflector. As depicted in FIG. 1, a stationary object is a central receiver 15, which is mounted at a pre-defined height above the ground level on a substantially centrally located tower 14. Said central receiver 15 is meant for absorbing the reflected solar radiation from heliostats 13 located around said central receiver 15. A stationary object like a central receiver can be located anywhere in the heliostat field. But a central location of a central receiver is appropriate, as it would achieve maximum collection of the incident solar radiation. The central location of the central receiver would optimize the positioning of the heliostats such that it would maximize the number of heliostats that are in the vicinity of the central receiver. And nearer the placement of heliostats, superior is the percentage of delivery of reflected sunlight on the central receiver.

Linear arrays of heliostats are mounted on parallel rotatable shafts 16. The rotatable shafts 16 are positioned horizontal, parallel and in east west direction and are preferably placed at the same height. Each rotatable shaft 16 provides a linear array of mounting means for mounting a linear array of heliostats. Flat or curved light reflecting heliostats 13 direct the incident solar radiation 17 onto the central receiver 15. The central receiver 15 of the system 11, supported by vertical masts of the tower 14, form a centrally located fixed target. The heliostats 13, positioned low with regard to ground level, are arrayed over the entire area of said heliostat field 12 that is selected to provide reflection of the solar radiation towards said central receiver 15. In order to prevent damage of heliostats by wind force, the positioning of the heliostats is kept as low as possible. In addition, the placement of heliostats in the horizontal plane helps to attenuate the wind from row to row, thereby reducing wind loading on heliostats 13. Furthermore, a wall around the heliostat field is advisably erected to reduce the wind load.

A common positioning mechanism is provided for heliostats for tracking the apparent altitudinal and azimuthal motion of the sun from dawn to dusk. Each said rotatable shaft is coupled with a geared motor drive means for providing rotational movement about first rotation axis that is horizontal and in east west direction. A plurality of said drive means provide synchronous and simultaneous rotation of said rotatable shafts to track changing azimuth angle of the incident solar radiation. An array of heliostats mounted on a rotatable shaft or arrays of heliostats mounted on rotatable shafts synchronously rotate about said first rotation axis so as to track the apparent azimuthal motion of the sun from dawn to dusk. In other words, an array of heliostats or all the heliostats of said heliostat field are subjected to periodic rotation, which is simultaneous, synchronous, and to equal extent about said first rotation axis so as to track the apparent azimuthal motion of the sun from dawn to dusk! Each said rotatable shaft provides a linear array of mounting means for mounting a linear array of heliostats. Each mounting means permits individual pivotal movement of the mounted heliostat with respect the related rotatable shaft about a second rotation axis that is perpendicular to said first rotation axis. Each heliostat of each linear array of heliostats, mounted on respective rotatable shaft, is individually adapted to be pivotably rotatable about said second rotation axis. Each rotatable shaft supports a rotation mechanism to individually rotate each mounted heliostat about said second rotation axis. Furthermore, the heliostats of each linear array of heliostats mounted on each rotatable shaft are linked mechanically so as to be pivotably rotatable in synchronism with changing altitude angle of incident solar radiation. A linear actuator, coupled with the rotation mechanism, causes synchronous rotation of the linear array of heliostats positioned over each rotatable shaft about said second rotation axis.

Rotation mechanism for altitude and azimuth axes for 'solar cell panels' is realizable with no trouble since at any given instant all such panels would merely require to face the sun as the sun traverses the sky. However, in a solar central receiver system, at any given instant, each heliostat would have a different orientation since all the heliostats have a fixed target and are required to reflect the incident solar radiation continually on said fixed target from dawn to dusk. In prior art, to simplify the solar tracking mechanism in a solar furnace, a common positioning mechanism is applied for either altitude or azimuth axis rotation. However, in the present invention, a common positioning mechanism for heliostats for both altitude and azimuth axes is made achievable due to the novel concept of a dynamic flattened manifestation of a humongous paraboloid concentrator.

The heliostats may be square-shaped or circular or rectangular or hexagonal or octagonal or polygonal. Heliostats having a square or rectangular perimeter are cheaper. Circular shaped heliostats have the largest area of non-interfering shape but are costly to manufacture. The heliostats may be flat or concave or paraboloid shaped and have a conventional supporting frame for rigidly holding their shape and contour and for preventing damage or bending. Heliostats may be fabricated from a plastic and clad with a reflective film like Mylar or Reflectech. Heliostats may be fabricated with metals such as polished aluminum, or steel with nickel/chromium plating, or glass with/without a silvered coating as in a mirror, or ceramics or other composites such as fiberglass or graphite or polymers or plastics having a reflective coating, or any other material that meets the structural and reflective properties required of a flat or curved or parabolic reflector. High reflectivity of heliostats could be availed from the use of vacuum deposited aluminum or silver.

The heliostat field of the present invention comprises a plurality of heliostats and may include tens or hundreds or thousands of heliostats. The number, size, shape and disposition of heliostats may differ in different embodiments as per the size of said heliostat field, the intended scale of power system (small or large), and the intended use of the solar central receiving system. For example, in a huge heliostat field like 4 acres land area, the heliostats would preferably be one square meter. Said heliostats would have a positioning height of approximately two to five feet above the ground level. For this size, the rows of said heliostats can be spaced apart laterally by a gap of 4 to 5 feet.

Various embodiments of solar central receiver systems and various embodiments of common positioning mechanisms described are exemplary and those experts in the art can very well recognize that numerous variations are possible without departing from the main theme.

FIGS. 8 to 18 schematically depict various embodiments of common positioning mechanism. There is an array of rotatable shafts positioned in east west direction. All these shafts are horizontal, parallel and positioned at about same height. The rotatable shafts are rigid, preferably tubular in type and rotate for simultaneously orienting a plurality of heliostats positioned over them. The axis of each said rotatable shaft (except in FIG. 11) is horizontal and east west directional. Each said shaft, rotatable for tracking the azimuthal movement of the sun, rotates to track the sun such that the array of heliostats mounted on said shaft continue to reflect the incident sunlight and focus it on to a fixed target. Each said rotatable shaft is coupled with a geared motor drive means for providing rotational movement about a first rotation axis that is horizontal and in east west direction. Said geared motor drive is preferably irreversible type such that its output shaft cannot rotate its input shaft.

Each said rotatable shaft provides a linear array of mounting means for mounting a linear array of heliostats. Each mounting means permits individual pivotal movement of the mounted heliostat with respect the related rotatable shaft about a second rotation axis that is perpendicular to said first rotation axis. Each heliostat of each linear array of heliostats, mounted on respective rotatable shaft, is individually adapted to be pivotably rotatable about said second rotation axis. Each rotatable shaft supports a rotation mechanism to individually rotate each mounted heliostat about said second rotation axis. Furthermore, the heliostats of each linear array of heliostats mounted on each rotatable shaft are linked mechanically so as to be pivotably rotatable in synchronism with changing altitude angle of incident solar radiation. A linear actuator, coupled with the rotation mechanism, causes synchronous rotation of the linear array of heliostats positioned over each rotatable shaft about said second rotation axis.

Said motor drive units or said linear actuators can be driven with the same drive signal, such that all the rows move simultaneously and synchronously. Or each said motor drive unit or each said linear actuator could be driven with an individual drive signal. A central processing unit (CPU) receives inputs from sensors and computer-generated predictions of the position of the sun in the sky and generates appropriate drive signals at periodic intervals for the solar altitudinal and/or azimuthal tracking. A drive signal to said motor drive units would cause synchronous and simultaneous rotation of rotatable shafts to track changing azimuth angle of the incident solar radiation. A drive signal to linear drive means would rotate arrays of heliostats mounted on respective rotatable shafts about said second rotation axis so as to track the apparent altitudinal motion of the sun from dawn to dusk.

As depicted in FIG. 8, each shaft 101 comprises a plurality of shaft segments 107 supported on bearings 108. Each bearing 108 is mounted in pedestal 102. Shaft segments 107 are coupled with each other via either flexible brake drum coupling 103 or by any other flexible coupling. The pedestals 102 are anchored to the ground. Or the pedestals 102 are supported on a long frame 105. Preferably the long frames 105 are such that they are able to support a plurality of shaft segments 107. Shafts 101 are positioned in east west direction and run parallel to each other. The distance between the parallel shafts is kept minimum but sufficient so that fouling of heliostats (not shown in the FIG. 8) mounted on these shafts is avoided in their any position. Frames 105 are having minimum height, which is sufficient for the free rotation of the heliostats. The frames 105 are strong enough to resist any load like dead weight of all the overlying components or wind load etc subjected on them. Between each pair of said shafts, access way is provided for the movement of people and equipment for maintenance and inspection purposes and for cleaning.

The shafts 101 are located with reference to a fixed target and are rotatable in horizontal east west direction for azimuthal tracking. Said shafts 101 are rotated to track the diurnal motion of the sun such that the heliostats positioned on said shafts 101 could constantly reflect the incident solar radiation on to the stationary object.

As depicted in FIG. 8, pluralities of shaft segments 107 are interconnected to form a shaft 101. Each shaft segment 107 preferably consists of a sturdy rotatable structure like a pipe having a tubular cross-section and long enough to mount preferably 2 to 4 heliostats (for example 3 to 5 meters long). At each end of the shaft segment 107, end flanges 109 are fitted. Said flanges 109 support circular projections 110 of the shaft segment 107. Each circular projection 110 is supported on bearing 108 mounted in a pedestal 102. Each half portion of flexible brake drum coupling 103 is supported on adjoining circular projection 110 so that all shaft segments 107 are coupled together. Or the adjoining shaft segments 107 are connected by flexible couplings and one brake is connected at the nondriving end of the shaft 101. An actuating rod 111 is supported in end flanges 109 via bushes 112 such that the said actuating rod 111 can move to and fro in a direction parallel to the axis of the shaft segment 107. Additionally, the actuating rod 111 is supported on supporting bushes 113 such that the deflection of actuating rod 111 is kept minimum. Actuating rod 111 of each shaft segment 107 is joined with another actuating rod 111 of the adjoining shaft segment 107 by means like coupling 114. In other embodiments, the actuating rod 111 can also be supported on the outside surface of shaft segment 107. The actuating rods 111 can be supported on the flanges 109 that are projected above the outer surface of the shaft segment 107.

An actuator 124 is fitted at one end of the actuating rod 111. At the other end of the actuating rod 111, tension is exerted by means like spring 125 so that the actuating rod 111 is always subjected to tension. Actuator 124 is always subjected to the tensile force exerted by spring 125. Hence, positive locking of the input shaft of the actuator 124 is required. The said input shaft is positively locked by a failsafe brake along with means like roller type bi-directional fold back device or irreversible drive like a worm reducer having a large reduction ratio. Said actuator, developing force and motion in a linear manner, may be a pneumatic actuator or an electric actuator or a motor or a hydraulic cylinder or a plasma actuator or a linear actuator etc. A plurality of links 115 are rigidly fitted on actuating rod 111 such that each link 115 is very close to a supporting bush 113. Supporting bush 113 and link 115 project out of the circular pipe 120 through slot 116 provided in said pipe 120. A plurality of supports 117 for the heliostats are pivoted by pivot pins 118 on brackets 119. Said brackets 119 are rigidly fitted on pipe 120. Support 117 can freely oscillate about said pin 118. A heliostat is to be mounted on each said support 117. Hence oscillation of said support 117 about pin 118 rotates respective heliostat (not shown in the figure) positioned over it. An arm 121 is rigidly fixed on support 117 such that it also oscillates along support 117 about pivot pin 118. Pin 122 is permanently fitted on arm 121 and the said pin 122 is engageable in a slot 123 formed in the body of link 115.

When the actuating rod 111 is linearly moved in the eastern direction by the actuator 124, said link 115 moves said pin 122 towards eastern direction and this results in the clockwise rotation of the arm 121 along support 117 about pin 118. Said clockwise rotation is preferably up to 30° (or more than 30° if needed) depending on the movement of the actuating rod 111. Initially when the movement is zero, the said clockwise rotation is zero and the support 117 is in the horizontal plane. And said clockwise rotation increases as the said movement of actuating rod 111 in eastern direction increases. However, the ratio of the said clockwise rotation and the said linear motion may or may not be constant. Similarly, when the actuating rod 111 is linearly moved in the western direction, the arm 121 along with the support 117 rotate in anticlockwise direction. And said anticlockwise movement is preferably up to 30° (or more than 30° if needed) depending on the movement of said actuating rod 111.

FIG. 9 is another embodiment to obtain azimuthal rotation of the heliostats. In this embodiment, the assembly of the rotatable shaft 101 and the actuating mechanism are practically identical to the embodiment described with reference to FIG. 8. However, instead of a slotted link and pusher mechanism, a chain sprocket and gear wheel transmission mechanism is assembled for generating a rotational motion of said support 117 when said actuating rod 111 is moved in eastern or western direction. In this chain sprocket and gear wheel transmission method, a plurality of chain segments 151 are rigidly fitted on actuating rod 111. A plurality of chain sprockets 152 are engageable with said plurality of chain segments 151 such that a to and from motion of the actuating rod 111 results in a rotational movement of the chain sprockets 152 about sprocket pins 153. Said sprocket pins 153 are fitted on the brackets 119. Said brackets 119 are rigidly fitted on pipe 120. Supporting bushes 113 are close to said chain sprockets 152. Each sprocket 152 and said supporting bush 113 are freely movable through the slot 116 provided in said pipe 120.

A plurality of supports 117 are pivoted by pivot pins 118 on brackets 119. Said supports 117 can have controlled oscillatory motion about said pins 118. A heliostat is to be mounted on each said support 117. Hence oscillation of said support 117 about pin 118 rotates respective heliostat (not shown in the figure) positioned over it. A gear sector 155 is rigidly fixed on each said support 117 such that it also oscillates along said support 117 about said pivot pin 118. Each said gear sector 155 is rotationally engageable with a gear wheel 154 coaxially fitted on the chain sprocket 152. Hence, the gear wheel 154 is subjected to a rotational motion of the chain sprocket 152 obtained by a to and fro motion of the actuating rod 111. Hence, said to and fro motion of the actuating rod 111 results in the rotational movement of the gear sector 155 along with the support 117.

When the actuating rod 111 is linearly moved in the eastern direction by the actuator 124, chain sprocket 152 rotates in clockwise direction. This results in the rotation of the gear wheel 154 in the clockwise direction by the same magnitude. Gear sector 155 is engaged with the gear wheel 154. Hence, the gear sector 155 is rotated in anticlockwise direction. Hence, the support 117 rotates in anticlockwise direction. Said anticlockwise rotation is preferably up to 30° (or more than 30° if needed) depending on the movement of the actuating rod 111. Initially, when the movement is zero, said anticlockwise rotation is zero and the support 117 is in the horizontal plane. And said anticlockwise rotation increases as said movement of the actuating rod 111 in the eastern direction increases. Said anticlockwise rotation is practically proportional to said movement of the actuating rod 111 in the eastern direction. Similarly, when the actuating rod 111 is linearly moved in the western direction, said gear sectors 155 along with the supports 117 rotate in the clockwise direction. Said clockwise rotation is practically proportional to said movement of the actuating rod 111 in the western direction.

FIG. 10 depicts yet another embodiment to obtain the rotation of the heliostats about the altitudinal axis. This embodiment is practically identical to the embodiment described with reference to FIG. 9 except that a rack 161 is rigidly fitted on the actuating rod 111 instead of said chain segments 151. And said rack 161 is engageable with said gear wheel 154.

Depicted in FIG. 11 is yet another embodiment to obtain rotation of the heliostats for tracking the apparent azimuthal movement of the sun. In this embodiment, the rotatable shafts are positioned horizontally and in north south direction, at about the same height, and rotatable about a first rotation axis that is horizontal and in north south direction. In this embodiment, the assembly of the rotatable shaft 101 and the actuating mechanism are also practically identical to the embodiment described with reference to FIG. 8. Here, Instead of a slotted link and pusher mechanism, a composite link mechanism consisting of links having rotational and linear movement is assembled for generating a rotational motion of said support 117 when said actuating rod 111 is moved in northern or southern direction. Furthermore, the embodiment is practicable when the rotatable shafts 101 are positioned horizontally and in north south direction at same height, and rotatable in horizontal north south directional first rotation axis. This embodiment can be used in colder zones that are beyond the tropic of cancer or Capricorn. A plurality of links 174 are rigidly fitted on actuating rod 111 such that each link 174 is very close to a supporting bush 113. Supporting bush 113 and link 174 project out of the circular pipe 120 through slot 116 provided in said pipe 120. A plurality of supports 117 for the heliostats are pivoted by pivot pins 118 on brackets 119. Said brackets 119 are rigidly fitted on pipe 120. Support 117 can freely oscillate about said pin 118. Each said support 117 is mounted for tracking the sun in azimuthal direction by rotating respective individual heliostat positioned over it. A swiveling link 171 is pivoted at its one end on link 174 via a pivot pin 172. The other end of the swiveling link 171 is connected to support 117 via a connecting pin 173. The support 117, swiveling link 171 and link 174 on actuating rod along with pivot pins 118, 172 and 173 form a mechanism such that when link 174 is moved towards southern direction by actuator 124, the swiveling link 171 swivels in downward direction and hence support 117 swivels in downward direction. The extreme position of support 117 will be horizontal, that is, parallel to the axis of the shaft segment 107. When the actuator 124 moves the link 174 via actuating rod 111 towards northern direction, the swiveling link 171 swivels upwards and hence support 117 swivels upwards in anticlockwise direction. In topmost position, support 117 would be inclined to the horizontal plane preferably by 50 degrees.

The disposition and orientation of a heliostat positioned on a rotatable shaft would depend on the location of the heliostat in the heliostat field and would be similar to the related attuned juxtaposed reflective segment. An elongated support is a topmost component of the mounting means and is provided for mounting a heliostat. Said supports are positioned parallelly and lengthwise over each said rotatable shaft. An H shaped bracket is positioned over each said support for realizing the distinct orientation, defined angle of inclination and balanced positioning of a heliostat fixed over said support.

The placement and fixation of each said H shaped bracket is critical. Midpoint of the central member of said H shaped bracket is fixed over midpoint of said support such that said central member of an H shaped bracket is collinear to the line joining the center of said heliostat field and said central member.

FIG. 7 diagrammatically depicts the scheme of disposition (orientation) of H shaped brackets for positioning of heliostats over them. Three H shaped brackets 75, 76 and 77 are depicted for illustration of said scheme. The heliostat field 71 has a central circular space 78 for the central tower and numeric 79 represents the center of said circular space 78. The east west oriented shaft 72 shows the supports 81, 82 and 83. A central member of each H shaped bracket is fixed over respective support. Each H shaped bracket has a medial member (numerals 84, 85 and 86 depict medial members of the H shaped brackets 75, 76 and 77 respectively), a lateral member parallel to said medial member (numerals 87, 88 and 89 depict lateral members of the H shaped brackets 75, 76 and 77 respectively), and a central member (numerals 90, 74 and 91 depict central members of the H shaped brackets 75, 76 and 77 respectively) joining them. The length of medial and lateral members would remain the same for all H shaped brackets, while the length of the central member of said H shaped bracket would decrease, as the angle of inclination of a heliostat would increase.

The midpoint of central member of an H shaped bracket is fixed on the midpoint of a support. As per its location in the heliostat field, an H shaped bracket is fixedly positioned on a support at a specific angle with respect to said support. An H shaped bracket is fixed on a support such that the central member of said fixed H shaped bracket forms an angle (angle 'a' as depicted in FIG. 9) with respect to respective said support. Said angle varies for each H shaped bracket on respective said support as per the location of said support in the heliostat field.

The placement and fixation of each said H shaped bracket is critical. Midpoint of said central member of said H shaped bracket is fixed over midpoint of respective said support such that said central member is collinear to the line joining the center of said heliostat field and the medial end of said central member. Dotted lines 92, 93 and 94 denote such collinear lines for said H shaped brackets 75, 76 and 77 respectively.

FIGS. 12 and 13 schematically illustrate the orientation angle 'a' for fixedly positioning of an H shaped bracket on a support, wherein said angle 'a' varies as per the location of a support in the heliostat field, and the angle of inclination 'b' formed by a heliostat on an H shaped bracket, wherein said angle of inclination 'b' varies as per the location of a heliostat in the heliostat field. FIG. 12 shows a top of view (a view seen from 'c') of the fixing arrangement of a heliostat 131 on an H shaped bracket 132. Besides, as depicted in FIG. 12, each H shaped bracket is fixed on respective support with the requisite angle 'a' as described hereinbefore and elsewhere. The midpoint of the central member of the H shaped bracket 132 is fixed on respective support 117 at its center such that centerline of said H shaped bracket lies at a specific angle 'a' with centerline of said support.

As depicted in FIG. 12, an H shaped bracket 132 consists of a central member fixed on support 117, a medial member at right angle to the central member and located medially towards the center of heliostat field, and a lateral member parallel to the medial member and at right angle to the central member and located towards the periphery of said heliostat field. At the medial end, on the medial member, a plurality of hinge support 133 are fixed. Pivot pin 134 is located in the hinge support 133 such that it is free to rotate about its own axis, and the pivot pin 134 is at right angle to said central member. Said heliostat 131 is fitted on the pivot pin 134 via pivot pin attachment 135 such that said heliostat 131 is free to oscillate along with pivot pin 134.

As shown in FIG. 13, the heliostat 131 is inclined with the H shaped bracket 132 at an angle of inclination 'b'. FIG. 13 is a cross section along line x-y shown in FIG. 12. Referring to FIG. 13, the inclination of the heliostat 131 with respect to the H shaped bracket 132, that is angle 'b', is mathematically determined, and accordingly the length of each leg assembly 136 supporting lateral aspect of respective heliostat 131, and the length of the central member of related H shaped bracket is determined. Inclination angle 'b' is minimal for heliostats 131 located near the stationary object and slowly increases in heliostats located towards the periphery of said heliostat field. The inclination angle 'b' of any heliostat is influenced by the position of said heliostat on a rotatable shaft, the location of said rotatable shaft in said heliostat field, and the height of the fixed target. Referring to FIGS. 12 and 13, the leg assembly 136 comprises spherical joint 137 and 138 fitted on the bottom face of the lateral aspect of each said heliostat, and spherical joint 139 and 140 fitted on the lateral member of the H shaped bracket. Spherical joints 137 and 139 are connected with each other via link means like a turn buckle, slotted link etc. Similarly, spherical joint 138 is connected with spherical joint 140 via link means like a turn buckle, slotted link etc. Angle of inclination 'b' can be precisely adjusted and fine tuned by adjusting the length of leg assembly 136.

At a specific location in the heliostat field, an H shaped bracket is positioned over a support at a precise angle of orientation (angle 'a'). Said angle 'a' can be mathematically determined. Similarly, at a specific location in the heliostat field, a heliostat is fixedly positioned over an H shaped bracket at a precise angle of inclination (angle of inclination 'b'). Said angle of inclination 'b' can be mathematically determined. For the said mathematical determinations of angle 'a' and angle 'b', it is assumed that the sun is at the zenith and directly overhead of the heliostat field and the incident solar radiation is vertical. Furthermore, since the mounting means are mounted on the rotatable shafts and the supports are the uppermost members of the mounting means, it is further assumed that said supports are topmost in their horizontal position with respect to the rotatable shafts. With these assumptions, mathematical calculation is done for positioning of each said H shaped bracket over respective support at an angle 'a', and mathematical determination is done for the angle of inclination 'b' for positioning each heliostat with respect to respective H shaped bracket.

Referring to FIG. 14, B is the center of a heliostat field, C is the center of a central member of an H shaped bracket installed on a support.

Hence BC is the distance from said center of said heliostat field to center of central member of said H shaped bracket.

Now MN is a line (line MN is either in east west direction or in north south direction) along which a rotatable shaft is positioned on which an array of heliostats is to be installed.

Said line MN is at a distance BA from the said center B, such that BA is perpendicular to said line MN. Hence AB is the minimal distance from said center B of said heliostat field to said line MN. Now the center of the central member of said H shaped bracket is fixedly positioned on the said support at point C such that said central member is oriented collinear to BC, and said central member makes an angle 'a' with respect to said support, which support is parallel to said shaft MN.

Now, Sin of angle a=AB/BC, where AB is the measured minimal distance from said center B of said heliostat field to said line MN (AB is the length of the side opposite the angle a), and where BC is the measured distance from said center B of said heliostat field to said point C where said central member of said H shaped bracket is fixed (BC is the hypotenuse).

Hence the angle 'a' is calculated by the expression Sin a=AB/BC.

In other words, said angle 'a' depends on a minimal distance between a center of said heliostat field and a hypothetical chord or a line whereupon a rotatable shaft is located on which a heliostat is positioned. Said minimal distance is a length of a side opposite said angle 'a'. Similarly said angle 'a' depends on distance between said center of said heliostat field to a position of a midpoint of said heliostat on said rotatable shaft. Said distance is a length of hypotenuse. Said angle 'a' is calculated by finding sine of said angle 'a', wherein said sine of said angle 'a' is equal to said length of said side opposite said angle 'a' divided by said length of said hypotenuse.

As shown in FIG. 13, each heliostat is inclined with respect to the respective H shaped bracket at an angle 'b'. The angle of inclination of a heliostat with respect to an H shaped bracket, that is angle 'b', is also mathematically determined.

Now as schematically depicted in FIG. 15, B is the center of a heliostat field where a fixed target is perpendicularly erected and R is the location of the fixed target, wherein said R is at a height H from the ground plane G, such that RB=H=height of said fixed target.

The distance from the heliostat EF to B=BC, where C is the location of the center of said heliostat EF positioned just above the ground level. Considering the enormity of the heliostat field and the height H, the negligible height of said EF above said ground level is ignored.

Now it is assumed that the incident sun rays are perpendicular to ground level.

Hence, the reflected sunray CR makes an angle θ with respect to the height of the fixed target RB such that tan θ=BC/RB, where the terms BC and RB are defined hereinabove.

And hence angle θ is defined by the above expression tan θ=BC/RB.

Angle SCR=angle CRB=angle θ, because RB is parallel to the incident vertical sunray SC.

Now EF is the position of the heliostat.

And CD is normal to EF.

The normal CD divides the angle SCR.

Hence angle SCD=angle θ/2=angle DCR.

Now angle RCB=angle α=angle 90 degrees−angle θ.

And normal DC is perpendicular to EF.

Hence angle DCE=angle 90 degrees=angle DCR+angle α+angle BCE=angle DCR+(angle 90 degrees−angle θ)+angle BCE.

Therefore angle 90 degrees=angle DCR+angle 90 degrees−angle θ+angle BCE.

Therefore angle θ=angle DCR+angle BCE.

But angle DCR=angle θ/2.
Therefore angle θ=angle θ/2+angle BCE.
Hence angle BCE=angle θ/2.
Since EF is seen crossing the ground plane, angle 'b'=BCE=θ/2 degrees.

Even with said mathematical determinations of angle 'a' and angle 'b', for fixedly positioning each H shaped bracket on a support and for fixedly positioning each heliostat on H shaped bracket, an alignment system is preferably used onsite. Here, the alignment and installation of heliostats is done with the vertically incident light and the supports in their topmost horizontal position, wherein the positioned heliostats properly focus the incident light on to the fixed target.

FIG. 16 schematically depicts the pattern of rotation of said heliostats about said first and said second rotation axis for tracking the apparent azimuthal and altitudinal movement of the sun respectively. FIG. 16 A schematically depicts a heliostat 181 positioned with a defined orientation and angle of inclination on a support 182 such that the incident vertical solar radiation 184 is reflected (reflected beam is shown by numeral 185) to fall on a fixed target 186. The support 182 is mounted on rotatable tubular shaft 183. Said rotatable shaft 183 (FIG. 16 A depicts a cross section of the rotatable shaft 183) is rotatable about said first rotation axis that is horizontal and east west directional. Now, it is assumed that there is no altitudinal movement of the sun. And the apparent azimuthal movement of the sun is 20 degrees towards south. To track this apparent 20 degrees azimuthal movement of the sun, as shown in FIG. 16 B, said rotatable tubular shaft 183 is rotated by 10 degrees towards south about said first rotational axis thereby rotating the heliostat 181 by 10 degrees towards south. The incident solar radiation 187 falling on heliostat 181 is seen to be reflected (reflected beam is shown by numeral 188) towards the fixed central receiver 186. FIG. 16 C depicts a diagrammatic representation of fixedly positioned heliostat 181 on a support 182 with a distinct orientation and angle of inclination such that the incident vertical solar radiation 189 is reflected (reflected beam is shown by numeral 190) to fall on a central receiver 186. FIG. 16 C depicts the pivotally rotatable support 182 mounted on a rotatable tubular shaft 183. Said support 182 is the mounting means for mounting the heliostat 181 over said rotatable shaft 183. Said mounting means is provided in a manner which permits individual pivotal movement of said heliostat 181 about a second rotation axis that is perpendicular to said first rotation axis. Suppose it is assumed that there is no azimuthal movement of the sun (as on the day of equinox) and the sun apparently moves 50 degrees towards west about altitude axis. As shown in FIG. 16 D, to track this apparent westward 50 degrees altitudinal movement of the sun, the heliostat 181 is rotated by 25 degrees towards west about said second rotational axis. The incident solar radiation 191 falling on heliostat 181 is seen to be reflected (reflected beam is shown by numeral 192) towards the fixed central receiver 186.

The heliostats are fitted on rotatable shafts. Though insignificant, the rotation of heliostats around said rotatable shafts has a play due to the required proper fitment of said heliostats. Said heliostats rotate along a circular path having a radius that is comparable to a radius of said rotatable shafts. Said rotatable shafts are rotated for tracking the sun from dawn to dusk, wherein reflected solar radiation also travels to a certain distance, which is proportional to said radius when said rotatable shafts are rotated. A compensatory controlled movement of the fixed target in a required direction is realized to trace said reflected solar radiation.

Here, in this embodiment, the tower/mount meant for supporting a fixed target supports a rectangular platform for mounting said fixed target. A straight or curved slide is fitted on said platform for movement of said fixed target in a required direction from dawn to dusk to trace said reflected solar radiation, wherein said fixed target is slid in the same direction and proportional to said travel of reflected solar radiation from dawn to dusk. A numerically controlled drive is fitted on said slide for said compensatory controlled movement of said fixed target in said required direction. When rotatable shafts are fitted in north south direction, said required direction is east to west from dawn to dusk and said slide is fitted in east west direction for the movement of said fixed target. And when rotatable shafts are fitted in east west direction, said required direction is north to south or south to north from dawn to dusk. Fitting said slide with a drive for compensatory westward movement of said fixed target is optional.

Yet another important embodiment is described hereinbelow with reference to FIGS. 17 and 18, wherein heliostats rotate around their centers and hence there is no radius of rotation. FIG. 18 is a schematically depicted cross sectional view of the FIG. 17. The heliostats have central holes and the east west directional rotatable shafts pass through said holes. When said shafts are rotated for tracking the azimuthal movement of the sun, the heliostats move around their centers about a first rotation axis that is horizontal east west directional. In this embodiment, as described in the embodiments hereinbefore, a rotatable shaft is composed of plurality of coupled shaft segments 201. Said shaft segments 201 are supported by bearings 202, which are mounted on pedestals 203. An actuating rod 204 is supported in the end flanges 205 of the shaft segments 201 via bushes 206. An actuator 207 as described in the embodiments hereinbefore is fitted at one end of the actuating rod 204. At the other end of the actuating rod 204, tension is exerted by means like a spring so that the actuating rod 204 is always subjected to tension. Hence, positive locking of the input shaft of the actuator 207 is required as described in the embodiments hereinbefore. Said actuator causes synchronous rotation of each heliostat of a linear array of heliostats on said shaft to track changing altitudinal angle of incident solar radiation. As described hereinafter with reference to FIGS. 17 and 18, each said heliostat of said array of heliostats individually rotates about said second rotation axis, which is perpendicular to first rotation axis. A plurality of slotted links 208 are permanently fixed on the actuating rod 204 via screws. A plurality of stub shafts 209 pass through the shaft segments 201 and are supported in the shaft segments 201 via bushes. A pair of trapezoidal flanges 210 are permanently fixed on said stub shafts 209 such that each said trapezoidal flange 210 is on either side of the shaft segment 201. A pusher rod 211 is permanently fitted in the pair of the trapezoidal flanges 210 such that the said pusher rod 211 is engageable in the slot 212 in the slotted link 208. When the actuating rod 204 is moved by the actuator 207 in eastern/western direction, the slotted link 208 pushes the pusher rod 211, which results in the rotation of the pair of the trapezoidal flanges 210 about the axis of said stub shaft 209. The said pair of the trapezoidal flanges 210 are permanently fitted with each other via a pair of member 213 situated at the two ends of the said pair of the trapezoidal flanges 210. Each said pair of members 213 has a hole 215 at their central aspect. One circular flanged male pivotal projection 216 having its circular projection suitable for said hole 215 is fitted around said hole 215 on each said member 213. Each heliostat 214 is having an eleptical shaped opening at its center through which the shaft segment 201 passes through. The size of the eleptical opening is large enough to accommodate the said trapezoidal flanges 210. The size of the major axis of the said eleptical opening in the heliostat 214 is large enough so that member 213 along with its said male pivotal projection 216 can be accommodated inside said eleptical opening. Two circular female projections 217 are fitted at the end of the major axis of the said eleptical opening in the heliostat 214. The bore of the said circular female projection 217 matches with the diameter of the male pivotal projection 216 such that the heliostat 214 is rotatable on the axis of male pivotal projection 216. The male pivotal projection 216 forms a pivot for heliostat 214. In other words, each member 213 has a hole through which a heliostat 214 is engageable via a pin or a projection for installation purposes. Each heliostat is rotatable about an axis of said pin or said projection. And heliostats are rotated about said axis of said pin or said projection while fixedly installing. The heliostat 214 are rotated about said axis of said pin or said projection (male pivotal projection 216) and are rigidly fixed at any desired angle via clamping means. The linear motion of the actuating rod 204 results in the movement of the heliostat 214 about the axis of the stub shaft 209. To and fro movement of said actuating rod 204 increases or decreases the angle 'c' of the trapezoidal flanges with respect to the axis of the shaft segment 207. A linear actuator is coupled with each said actuating rod for achieving the to and fro movement of said actuating rod that results in rotation of the heliostats about the axis of stub shaft 209. Now as described with reference to FIG. 15, at a specific location in a large heliostat field, the angle of inclination of a heliostat with respect to ground level is equal to angle θ/2 degrees, wherein said angle θ can be mathematically calculated. Hence in this embodiment, a heliostat at a specific location in a large heliostat field is rotated about said axis of stub shaft and about said pivot such that the whole plane of said heliostat makes said angle θ/2 with respect to the ground level, wherein a line joining the center of the heliostat field and midpoint of medial border of said heliostat is perpendicular with respect to medial border of said heliostat. Or the position of each heliostat of the heliostat field can be determined with the help of available softwares, wherein the position of each heliostat in the heliostat field, position and height of the stationary object, and the position of the sun at the zenith are inputted. Once such a position is achieved, wherein a heliostat makes related angle θ/2 with respect to the ground level, wherein a line joining the center of the heliostat field and midpoint of medial border of said heliostat is perpendicular with respect to medial border of said heliostat, then said heliostat is rigidly fixed at that formed angle of rotation with respect to said members of said trapezoidal flanges about said pivot via clamping means. Similarly said heliostat is set in the same angle of inclination with respect to said shaft. All the heliostats of said heliostat field are positioned in a similar way as described hereinabove. From this attained position, said heliostats are synchronously rotated to the required current position. The said shaft or shafts are rotated about the axis of said shaft or shafts, which is either horizontal and east west directional first rotation axis or horizontal north south directional first rotation axis for tracking the apparent azimuthal or altitudinal movement of the sun respectively. Similarly, said linear actuators, coupled with said actuating rods, achieve the to and fro movement of said actuating rods resulting in rotation of said heliostats about the axis of said stub shafts, which is a second rotation axis that is perpendicular to said first rotation axis for tracking the apparent motion of the sun.

To compensate for said radius of rotation of the heliostats as described hereinbefore, as depicted in FIG. 19, a large single curved collecting mirror (a convex or concave reflector mirror) is installed at one side of the heliostat field. FIG. 19 illustrates yet another important embodiment of the present invention employing a large curved single collecting mirror 233 (a single collecting reflector 233) as a stationary object, installed for refocusing the delivered solar radiation on to a receiver. Here in this embodiment, a single collecting reflector 233 is preferably installed on one side of a heliostat field as is installed in solar furnace at Pyrenees-Orientales in France. As shown, a heliostat field consists of arrays of heliostats 231 positioned low over the ground plane. The positioning of rotatable shafts 232, the positioning of arrays of heliostats 231 on rotatable shafts 232, and configuring a common positioning mechanism on each rotatable shaft 232 etc are as described in the text hereinbefore. Said common positioning mechanism is employed to synchronously rotate said heliostats 231 for altitude and/or azimuth axis orientation for tracking an apparent movement of the sun in the sky. Subsequent to each said orientation of said heliostats 231, collective disposition of said heliostats always forms an arrangement that is capable of reflecting and thereby delivering incident solar radiation on to said single collecting reflector 233. Said heliostats 231 of said heliostat field reflect and thereby focus the incident solar radiation 235 and deliver it on said large single curved mirror 233. Said single collecting reflector 233 may be a convex or a concave reflector mirror for refocusing the delivered solar radiation concentrate by said heliostats 231 (use of a convex or a concave reflector mirror for refocusing is a known art). The delivered solar radiation concentrate 236 is further refocused by said single collecting reflector 233 on a receiver 234, which receiver 234 is mounted at the focal point of the said single collecting reflector 233. Instead of said receiver 234, a thermal cycle engine like a Stirling engine may be placed. To compensate for said radius of rotation of the heliostats, to compensate for mechanical error in precision while rotating said heliostats, to widen said stationary target to accommodate near about entire delivered solar radiation for better results, and depending on need, said single collecting reflector 233 may have an area of about 0.1% to 1.5% of said heliostats field. Said single collecting reflector 233 is capable of withstanding high temperatures. Preferably, a cooling mechanism like a heat sink is provided on nonreflecting backside of said collecting reflector 233. Said single collecting reflector 233 may be a dielectric mirror such that its absorption of the radiation is negligible.

To compensate for said radius of rotation of the heliostats, to compensate for mechanical error in precision while rotating the heliostats, and to widen the stationary target to accommodate near about entire delivered solar radiation for better results, as schematically depicted in FIG. 20, a plurality of collecting reflectors 276 to 279 (stationary object) are used for refocusing the delivered solar radiation from heliostats 268 to 275 on respective receivers 280 to 283. FIG. 20 depicts this another important embodiment of the present invention, wherein the common positioning mechanism is employed for orienting said heliostats with respect to a plurality of collecting reflectors and the sun such that incident solar radiation upon said heliostats is focused upon said plurality of collecting reflectors 276 to 279 from dawn to dusk and thereby deliver the concentrated solar radiation upon said plurality of collecting reflectors 276 to 279. As shown in the FIG. 20, a heliostat field consists of arrays of heliostats (as denoted by numerals 268 to 275 as an exemplification) positioned low over the ground. The positioning of rotatable shafts, the positioning of arrays of heliostats on rotatable shafts (as denoted by numerals 260 to 267 as an exemplification), and configuring a common positioning mechanism on each said rotatable shaft are as described in the text hereinbefore with reference to FIGS. 1-18. Four large curved mirrors 276 to 279 (collecting reflectors 276 to 279) are installed in the central area of said heliostat field. Said collecting reflectors 276 to 279 are installed for refocusing the delivered solar radiation by said arrays of heliostats upon respective receivers 280 to 283. Said collecting reflectors 276 to 279 are functionally similar to the curved mirror installed at Pyrenees-Orientales in France. As depicted in FIG. 20, said heliostats of said heliostat field reflect and thereby focus the incident solar radiation on said large curved mirrors 276 to 279. The delivered solar radiation concentrate is further refocused by said large curved mirrors 276 to 279 on receivers 280 to 283 respectively, which receivers 280 to 283 are mounted at the focal points of said curved mirrors 276 to 279 respectively. Said large curved mirrors 276 to 279 are capable of withstanding high temperatures. Preferably, a cooling mechanism like a heat sink is provided on nonreflecting backside of said collecting reflectors. Or said collecting mirrors may be dielectric mirrors.

FIG. 21 depicts yet another embodiment of the present invention. As shown, a heliostat field 301 consists of arrays of heliostats 300 positioned low over the ground plane 302. The positioning of the arrays of heliostats on rotatable shafts about a central tower and configuring common positioning mechanism is as described in the text hereinbefore. Said heliostats of said heliostat field 301 reflect and thereby focus the incident solar radiation 305 and deliver it on a large curved mirror 303. Said large curved mirror may be a convex or concave reflector mirror for refocusing (use of a convex or a concave reflector mirror for refocusing is a known art) the delivered solar radiation concentrate by said heliostats. Said curved mirror may be similar to the one that is installed at Pyrenees-Orientales in France. Said curved mirror 303 is mounted on vertical supports such that the axis of said curved mirror 303 coincides with the axis of the solar central receiver system of present embodiment. And said optic axis of the solar central receiver system passing through the center of said curved mirror 303 lies perpendicular to a plane tangent to the center of said curved mirror. The delivered solar radiation concentrate is further refocused (refocused solar radiation is depicted by numeral 306) by said large curved mirror 303 (collecting reflector 303) on a receiver 304, which receiver 304 is mounted above said ground plane 302 underneath said curved mirror and at the focal point of said curved mirror 303. Preferably said curved mirror has an area of about 0.1% to 1.5% of said heliostats field. Said large curved mirror is capable of withstanding high temperatures. Preferably, a cooling mechanism like a heat sink is provided on nonreflecting backside of said collecting reflector. Said large curved mirror may be a dielectric mirror.

Said receivers as described and depicted in embodiments with reference to FIG. 19-21 are capable of withstanding high temperatures and enclose a heat transfer fluid like molten salts or synthetic oil or liquid metals. Each said receiver absorbs incident solar energy from related collecting reflector and converts said solar energy to thermal energy. Said absorbed solar energy heats up said heat transfer fluid, and the heated said heat transfer fluid is transferred into a hot thermal storage tank, wherein said hot thermal storage tank permits electrical power production that is not concurrent with availability of sunlight. The energy conversion system for said electrical power production can be a Rankine cycle conversion system, wherein heated said heat transfer fluid from said hot thermal storage tank is transferred to a boiler/heat-exchanger to produce steam. Said steam powers a steam turbine to produce electricity. Or the energy conversion system can a Brayton cycle conversion system. Or when said receiver or said receivers absorb incident concentrated solar radiation, wherein very high temperature is achieved, then such a high temperature can be used for separation of water molecules in to hydrogen and oxygen. Or instead of said receiver or receivers, a thermal cycle engine like a Stirling engine coupled to an electric generator may be placed. Or said solar radiation concentrate can be used to heat the water for residential or commercial use or to heat the swimming pools. Or said solar radiation concentrate could be aimed at mechanical/thermo-voltaic generator or thermopile or photovoltaic conversion with great advantage.

Alternatively, in another embodiment as depicted in FIG. 22, a curved concave mirror 310 is mounted behind the focal point 311 of the solar central receiver system of present embodiment such that the focused solar radiation 312 delivered by the heliostats 313 is 'collimated and reflected' (collimated and reflected radiation is depicted by numeral 316) towards the central area of the heliostat field. (Or a convex mirror can also be used in this embodiment. Using a convex mirror for collimation purposes is also a known art.). The 'center of said heliostat field' 314, said focal point 311 and the center of said curved concave mirror 310 lie on the optic axis 315. The said curved concave mirror 310 is positioned such that the said optic axis 315 passing through its center lies substantially perpendicular to a plane tangent to the center of said curved mirror. Said focal point 311 of the solar central receiver system lying on said optical axis 315 is at the focus of said curved concave mirror 310. The perimeter of said curved concave mirror encompasses the entire divergent beam of the focused solar radiation concentrate, which falls on its concave reflecting surface. Said collimated solar concentrate is made incident on a receiver light pipe 317 and is used for lighting the inside of buildings. Said receiver light pipe 317 is positioned underneath said collimating reflector 310 such that the axes of said receiver light pipe and said collimating reflector coincide with the optic axis 315 of said solar central receiver system. Concentrated and collimated light entering in said receiver light pipe 317 is routed and circulated for lighting inside of buildings or for hybrid solar lighting. A cost effective version of Hybrid Solar Lighting can be availed when such a solar central receiver system is roof-mounted and wherein the collimated solar radiation concentrate is routed by said receiver light pipe and circulated by large-diameter optical fibers as in conventional art for lighting inside of buildings. Or the collimated solar concentrate 316 can be re-concentrated on a receiver by positioning a concave/paraboloid mirror. Or said collimated solar radiation concentrate can be used to heat water for residential or commercial use or to heat swimming pools. Or said collimated solar radiation concentrate could be aimed at mechanical/thermo-voltaic generator or thermopile or photovoltaic conversion with great advantage.

Pertaining to various embodiments as described with reference to FIGS. 1-22, for the convenience of the description purposes, the rotatable shafts were assumed to be positioned horizontal and in east west direction. Alternatively, Pluralities of rotatable shafts can be positioned horizontally and in north south direction instead of east west direction, at same height, and rotatable about a first rotation axis that is horizontal and in north south directional. Here, the heliostat field would consist of flat or curved light reflecting heliostats grouped in horizontal north south directional linear and parallel arrays instead of east west directional linear and parallel arrays. the positioning of the arrays of heliostats on rotatable shafts and configuring common positioning mechanism would be as described hereinbefore in the text with reference to FIGS. 1-18.

The position of a celestial object like the sun can be defined by specifying its altitude and its azimuth. The altitude of an object is equal to its angle in degrees above the horizon. The azimuth of an object is equal to its angle in the horizontal direction, with north at 0°, east at 90°, south at 180°, and west at 270°. As the Earth rotates, the sun appears to rise and set, constantly changing its altitude and azimuth. Sun's altitude and azimuth also varies according to an observer's location on Earth. The sun rises in the east and sets in the west everywhere on the Earth. The Earth's rotation tilts about 23.5 degrees on its pole-to-pole axis, relative to the plane of Earth's solar system orbit around our sun. The sun's declination at the spring equinox is 0°. It moves up to 23.5° in the summer, then drifts back down through 0° at fall equinox, and down to −23.5° in the winter. As the Earth orbits the sun, this creates the 47 degree peak solar azimuth angle difference and the hemisphere-specific difference between summer and winter. In the northern hemisphere, the winter sun rises in the southeast, peaks out at a low angle above the southern horizon, and then sets in the southwest. In the northern hemisphere in summer, the sun rises in the northeast, peaks out nearly straight overhead (depending on latitude), and then sets in the northwest.

A solar tracking system of the present invention, as in prior art, comprises a central processing unit (CPU), a memory, and logic-based application software including CPU-executable code loaded in said memory. Predictions of the location of the Sun in the sky are based on the date, time, longitude and latitude related to the heliostat field. The CPU receives inputs from sensory means as in prior art, such as optical sensors, radiofrequency sensors, magnetic sensors, position-sensing detectors, optoelectric sensors, radiofrequency identifier tag or magnetic strip. Position-sensing or positional error detection by an aiming device enables fine scale pointing and tracking. Using the predicted location of the sun, inputs from sensors, height and position of said central receiver, and elevation of heliostats, the CPU periodically calculates an azimuth and elevation angle for heliostats, and said heliostats are positioned accordingly such that the entire reflected solar radiation falls on the desired target. The solar tracking system generates controlling commands such that the geared electric motor drive units simultaneously and synchronously rotate the rotatable shafts to same extent about said first rotation axis such that the heliostats rotate to track the apparent azimuthal motion of the sun. (Or track the altitudinal motion of the sun when the said rotatable shafts are positioned horizontal and in north south direction). Similarly, the solar tracking system generates controlling commands such that said actuators simultaneously and synchronously rotate pivotably rotatable said mounts of said heliostats located on respective each said rotatable shaft to same extent about said second rotation axis such that said heliostats rotate to track the apparent altitudinal motion of the sun. (Or track the azimuthal motion of the sun when the said rotatable shafts are positioned horizontal and in east west direction). The motor drive units or the actuators can be driven with the same drive signal, such that all the rows of heliostats move simultaneously, synchronously and to same extent. Or each said motor drive unit and each said actuator could be driven with an individual drive signal, wherein respective rotatable shaft is rotated about said first rotation axis by said individual drive signal and/or respective array of heliostats is rotated about said second rotation axis by said individual drive signal. Once the entire heliostats are synchronously rotated to the same extent for the apparent altitudinal and/or azimuthal movement of the sun, a single heliostat from each array of heliostats can be used for fine-tuning the related array of heliostats. As described in various embodiments of the present invention, an array of heliostats mounted on a rotatable shaft can function as a single unit. Each rotatable shaft has a motor drive unit for synchronously rotating its array of heliostats about said first rotation axis. Each rotatable shaft has an actuating mechanism for pivotably rotating the heliostats located on that rotatable shaft. Said actuating mechanism rotates mounts of heliostats simultaneously and synchronously to same extent about said second rotation axis. Consequently, a single heliostat from each array of heliostat can have an independent sensing, tracking and alignment system. Each said motor drive unit and each said actuator could be driven with a distinct drive signal, wherein respective rotatable shaft is rotated about said first rotation axis by said individual drive signal and/or respective array of heliostats is rotated about said second rotation axis by said individual drive signal.

In solar furnaces of the prior art, it is essential to individually control rotations of mirrors of each of pluralities of heliostats in accordance with the diurnal movement of the sun. This necessitates individual sensing and alignment devices for heliostats, a state of the art computer for predicting and controlling the required altitudinal and azimuthal rotation of each heliostat, and protecting said computer from heat and dust. However, in the present invention, predicting the required altitudinal and/or azimuthal rotation of even a single heliostat would suffice. This would greatly reduce the cost.

While rotating the heliostats for solar tracking, a mechanical error in precision may occur. Mechanical errors may add up and may result in inaccurate aiming. Hence to minimize such errors, when required or intermittently, the entire heliostats are prepositioned in a preprogrammed state, wherein the sun is assumed at the zenith and the supports are moved to their topmost horizontal position, and wherein collective disposition of said heliostats forms an arrangement that is capable of reflecting and thereby focusing entire incident vertical solar radiation on to a fixed target. From this preprogrammed position, all the heliostats are again synchronously rotated to the required current position.

Extensive references are available in literature, which richly describe the sun tracking and target alignment processes for heliostats of a solar furnace, their mechanism and various applications. To align the mirrors of heliostats to their fixed target while fixedly installing on respective supports or to align the mirrors of heliostats for tracking the apparent motion of the sun from dawn to dusk, a computer based alignment system of present art is preferably used. An alignment apparatus or a positional error detection instrument may be used to assist said computer based alignment system. Such positional error detection instrument is described by Litwin, Robert Z.; et al in US patent application 20050274376, and said patent application is incorporated herein with reference. A sun tracking system for a central receiver solar power plant, by Reznik; Dan S.; et al in US patent application 20090107485, describes a system that uses cameras for acquiring pointing samples by setting the direction of reflection of the heliostats and detecting concurrent sunlight reflections into the cameras. Said system can also be included for solar tracking and proper pointing of mirrors of heliostats of present invention. Said application 20090107485 is also incorporated herein with reference.

Certain embodiments of the solar central receiver system employing common positioning mechanism for heliostats of the present invention have a tower top configuration in which a field of heliostats reflect sunlight onto a central receiver mounted on a tower structure. In other embodiment, a collecting mirror is used to further concentrate the reflected solar radiation, which is made incident on a receiver. Said central receiver or said receiver is capable of withstanding high temperatures of approximately 1200 to 1800 degrees Fahrenheit or more. The concentrated solar energy incident on said central receiver or said receiver is absorbed and converted to thermal energy by heating an enclosed heat transfer fluid like molten salts (for example, alkaline earth fluorides and alkali metal fluorides) or synthetic oil or liquid metals. This heated heat transfer fluid is then transferred to a boiler/heat-exchanger to produce steam, which then powers a steam turbine to produce electricity. Like any conventional solar furnace, the present invention employs the prior art mechanism for harvesting solar energy. The heated heat transfer fluid of said central receiver or said receiver flows into a hot thermal storage tank. The hot thermal storage tank permits electrical power production that is not concurrent with the availability of sunlight. When needed, the heated heat transfer fluid is pumped from the hot thermal storage tank and circulated through the energy conversion system that uses thermal energy from the heat transfer medium to generate power. For example, a steam generator uses the heat transfer fluid to generate high quality steam. The output of the steam generator is fed to a conventional electric power generation. The energy conversion system can be a Rankine cycle conversion system or a Brayton cycle conversion system. Once the heat from the heat transfer fluid is removed, the heat transfer fluid is transported back to the cold storage tank for reuse.

The above description thus indicates certain embodiments of the present invention, and it is apparent to those expert and skilled in the art that numerous versions and modifications and variations may be made without departing from the theme and the scope of the present invention. The present invention may, of course, be carried out in other specific ways than those herein set forth without departing from the spirit and essential characteristics of the invention. The detailed description of the invention with reference to drawings should therefore be considered in all respects as illustrative and not restrictive, and all changes coming within the meaning and equivalency range of the detailed description are intended to be embraced therein.

We claim:

1. A solar central receiver system for concentrating and harvesting incident sunrays, said system comprising a stationary receiver for absorbing the concentrated sunrays, and a heliostat field made up of a plurality of reflecting units that are disposed in horizontal linear arrays laid out in parallel on the ground surface adjacent to said stationary receiver for concentrating the incident sunrays onto said stationary receiver;

wherein a reflecting unit of said plurality of reflecting units comprises:

1) a plurality of linearly coupled modules, wherein a module of said plurality of linearly coupled modules comprises:

a) a supporting frame fixed on the ground, b) a rotating assembly in operating association with said supporting frame further comprising:

i) a rotatable shaft segment rotatable about a first rotation axis characterized in having a circular projection at both ends thereof for linear and coaxial coupling with one or more rotatable shaft segments of another adjoining one or more modules;

ii) a linear array of mechanically connected mounts linearly supported on the body of said rotatable shaft segment;

iii) a linear array of mechanically connected heliostats mounted on said linear array of mechanically connected mounts such that a heliostat of said linear array of mechanically connected heliostats is mounted on a mount of said linear array of mechanically connected mounts;

iv) each heliostat of mounted said linear array of mechanically connected heliostats is positioned with a distinct angle of orientation and a distinct angle of inclination according to its location relative to said stationary receiver;

v) each mount of said linear array of mechanically connected mounts permit individual pivotal movement of each mounted heliostat about an individual second rotation axis;

vi) an actuating rod segment having a projection at both ends thereof for linear and coaxial coupling with one or more actuating rod segments corresponding to another adjoining one or more modules and supported on the body of said rotatable shaft segment via one or more bushes such that said actuating rod segment can freely and linearly slide in the said one or more bushes parallel to said rotatable shaft segment;

vii) couplings for rotatably coupling rotatable shaft segments of the said plurality of linearly coupled modules;

viii) linear couplings that connect actuating rod segments of said plurality of linearly coupled modules;

2) a first drive of a common positioning mechanism fixed on said supporting frame for rotating the plurality of linearly coupled rotatable shaft segments of said plurality of linearly coupled modules about their common said first rotation axis which is perpendicular to each said second rotation axis, wherein the rotation of said plurality of linearly coupled rotatable shaft segments indirectly rotates mounted linear arrays of mechanically connected heliostats of said reflecting unit about said first rotation axis;

3) a second drive of said common positioning mechanism fitted on said rotating assembly at one end of said reflecting unit, and linearly coupled with one end of rigidly connected actuating rod segments of said plurality of linearly coupled modules of said reflecting unit for synchronously rotating linear arrays of mechanically connected heliostats of said reflecting unit about their second rotation axes;

4) a central processing unit of said common positioning mechanism for generating controlling commands for said first drive and/or for said second drive for rotating said linear arrays of mechanically connected heliostats about said first rotation axis and/or said second rotation axes for tracking the moving sun in the sky such that the incident solar radiation is reflected and focused on said stationary receiver; and wherein said linear arrays of mechanically connected heliostats of said plurality of reflecting units are synchronously maneuverable in an altitudinal axis and/or azimuthal axis for tracking a changed position of the sun in the sky by said common positioning mechanism such that each heliostat of said linear arrays of mechanically connected heliostats is continuously placed perpendicular to the bisector of an angle formed by a solar vector and a stationary receiver vector relative to said each heliostat.

2. The solar central receiver system according to claim 1, wherein, said stationary receiver is mounted at a predefined height above ground level.

3. The solar central receiver system according to claim 1 characterized in that horizontal parallel arrays of said plurality of reflecting units are positioned in orientations chosen alternatively between east-west direction and north-south direction.

4. The solar central receiver system according to claim 1, wherein each heliostat of said linear arrays of mechanically connected heliostats is a computer controlled reflecting device employed to reflect incident sunlight on said stationary receiver and having either flat or curved reflecting surface.

5. The solar central receiver system according to claim 1, characterized in that the number of modules in said plurality of linearly coupled modules in said reflecting unit varies according to shape and size of available land area for installation of said solar central receiver system.

6. The solar central receiver system according to claim 1 characterized in that each heliostat of said linear array of mechanically connected heliostats is precisely positioned on said rotatable shaft segment of each module of said reflecting unit with said distinct angle of orientation, wherein, for a defined location of the sun in the sky, said distinct angle of orientation is mathematically calculated according to the location of said each heliostat in said heliostat field, and according to the position of said stationary receiver on which incident solar radiation is to be focused.

7. The solar central receiver system according to claim 6 wherein each heliostat in said linear array of mechanically connected heliostats is precisely positioned on said rotatable shaft segment of said reflecting unit with said distinct angle of orientation wherein a minimal distance between said stationary receiver and the longitudinal axis of linearly coupled rotatable shaft segments of said reflecting unit is a side opposite said angle of orientation in an imaginary right triangle including said angle of orientation as an acute angle, a distance between said stationary receiver and a midpoint position on said each heliostat is a hypotenuse in said imaginary right triangle, and the sine of said distinct angle of orientation is equal to the length of said opposite side divided by the length of said hypotenuse.

8. The solar central receiver system according to claim 1, characterized in that each heliostat of said linear array of mechanically connected heliostats is precisely positioned on said rotatable shaft segment with said distinct angle of inclination, wherein for a defined location of the sun in the sky said distinct angle of inclination is mathematically calculated according to the location of said each heliostat in said heliostat field, and according to the position of said stationary receiver on which incident solar radiation is to be focused.

9. The solar central receiver system of claim 8 wherein each heliostat in said linear array of mechanically connected heliostats is positioned on said rotatable shaft segment of said reflecting unit with said distinct angle of inclination wherein said distinct angle of inclination is angle $\theta/2$ wherein a length between said stationary receiver and a midpoint of said each heliostat is a side opposite said angle $\theta$ in an imaginary right triangle including said angle $\theta$ as an acute angle, and said height of said stationary receiver is a side adjacent to said angle $\theta$ in said imaginary right triangle; and the tangent of said angle $\theta$ is equal to the length of said opposite side divided by the height of said adjacent side.

10. The solar central receiver system according to claim 1 wherein rotatable shaft segments of said plurality of linearly coupled modules of said reflecting unit are linearly, coaxially and rotatably coupled, and comprise a hollow body having circular or rectangular or square shaped cross section.

11. The solar central receiver system according to claim 1 wherein actuating rod segments of said plurality of linearly coupled modules of said reflecting unit are linearly, coaxially and rigidly coupled.

12. The solar central receiver system according to claim 10 wherein one end of linearly coupled rotatable shaft segments of said plurality of linearly coupled modules of said reflecting unit is coupled with said first drive for generating oscillating or rotating motion about said first axis of said linearly coupled rotatable shaft segments.

13. The solar central receiver system according to claim 1 wherein linearly coupled rotatable shaft segments of said plurality of linearly coupled modules of said reflecting unit support rigidly connected actuating rod segments of said plurality of linearly coupled modules of said reflecting unit, wherein said rigidly connected actuating rod segments are adapted to move in a direction parallel to said first axis of said linearly coupled rotatable shaft segments, and wherein said rigidly connected actuating rod segments further comprise pusher pins or pusher links or chain segments or rack segments affixed thereto for pivoting heliostats of said linear arrays of mechanically connected heliostats of said reflecting unit.

14. The solar central receiver system according to claim 10, wherein said linearly coupled rotatable shaft segments of said reflecting unit at their one end support said second drive that is coupled to one end of said rigidly connected actuating rod segments of said reflecting unit for synchronously rotating said linear arrays of mechanically connected heliostats about said second rotation axes for tracking diurnal motion of the sun such that said linear arrays of mechanically connected heliostats reflect the incident solar radiation on to said stationary receiver.

15. The solar central receiver system according to claim 1, wherein said linear array of mechanically connected mounts permit individual pivotal movement of mounted heliostats about their respective second rotation axis, wherein each mount of said linear array of mechanically connected mounts further comprises:
  a) a vertical support rigidly fitted on said rotatable shaft segment;
  b) one or more oscillating members pivoted by a horizontal pivot pin on said vertical support such that said one or more oscillating members freely oscillate about an axis of said horizontal pivot pin, which axis is said second rotation axis;
  c) a connecting support rigidly fitted on top of said one or more oscillating members such that said connecting support oscillates along with the said one or more oscillating members; and
  d) a lockable pedestal assembly fitted on said connecting support wherein said lockable pedestal assembly is rotatable in a horizontal plane about a vertical pin and lockable in a position, and wherein one of the heliostats is supported on said lockable pedestal assembly via a lockable hinge fitted on said lockable pedestal assembly, wherein said lockable pedestal assembly is locked such that an angle of orientation of said heliostat is fixedly maintained, and wherein said lockable hinge is locked such that an angle of inclination of said heliostat is fixedly maintained.

16. The solar central receiver system according to claim 15 wherein said one or more oscillating members comprise one or more slotted arms.

17. The solar central receiver system according to claim 15 wherein said one or more oscillating members contain a pin type projection wherein said pin type projection is moved by said second drive.

18. The solar central receiver system according to claim 15 wherein said one or more oscillating members are pushed by said second drive, said second drive further comprising:
 a) an actuator, linearly coupled with one end of said rigidly connected actuating rod segments and supported on one end of linearly coupled rotatable shaft segments of said reflecting unit, for imparting horizontal to and fro movement to said rigidly connected actuating rod segments, wherein said to and fro movement is parallel to said first axis of said linearly coupled rotatable shaft segments; and
 b) a pusher mechanism comprising of a plurality of pusher links or a plurality of pusher pins fixedly positioned on said rigidly connected actuating rod segments, wherein said pusher links or said pusher pins are engageable with said one or more oscillating members such that said to and fro movement of said rigidly connected actuating rod segments results in an oscillatory movement of said one or more oscillating members.

19. The solar central receiver system according to claim 2 wherein said stationary receiver is capable of withstanding temperature up-to 1800 degrees Fahrenheit and encloses a heat transfer fluid comprising water or air or molten salts or synthetic oil or liquid metals, wherein said stationary receiver is an enclosure containing heat transfer fluid or a boiler or a heat-exchanger or a thermal cycle engine or a mechanical or thermo-voltaic generator or solar cells or a thermopile.

20. The solar central receiver system according to claim 2 wherein said stationary receiver comprises a collecting reflector positioned on one side of said heliostat field at a pre-defined height above ground level, wherein said collecting reflector re-reflects and focuses delivered concentrated solar radiation onto a secondary receiver, wherein said secondary receiver is placed at a focal point of said collecting reflector.

21. The solar central receiver system according to claim 2 wherein said stationary receiver comprises a collimating reflector mounted on a centrally located tower at a pre-defined height above ground level in a manner such that said collimating reflector is coaxially and perpendicularly positioned with respect to an optic axis of said solar central receiver system whereby the focused solar radiation delivered by said linear arrays of mechanically connected heliostats of said plurality of reflecting units on said collimating reflector is collimated and reflected on a light pipe positioned underneath said collimating reflector in a manner that an axis of said light pipe and said collimating reflector coincide with an optic axis of said solar central receiver system to thereby result in that the concentrated and collimated solar radiation entering in said light pipe is routed and circulated for lighting inside of buildings or for hybrid solar lighting.

22. The solar central receiver system according to claim 1 wherein said central processing unit hosts a control program that when executed, prescribes routines for solar tracking utilizing stored application software, wherein said control program predicts location of the sun in the sky based on date, time, longitude and latitude related to location of said solar central receiver system, wherein characteristically by using predicted location of the sun in the sky, said central processing unit periodically calculates required rotation of heliostats of said linear arrays of mechanically connected heliostats about said first rotation axis and/or said second rotation axes such that said heliostats of said linear arrays of mechanically connected heliostats reflect incident solar radiation on said stationary receiver.

23. The solar central receiver system according to claim 22 wherein said central processing unit under said control program generates controlling commands as per the required rotation calculated for said heliostats of said linear arrays of mechanically connected heliostats via actuation of
 a) said first drive for rotating said linearly coupled rotatable shaft segments of said plurality of reflecting units about said first rotation axis for tracking an apparent motion of the sun in the sky; and
 b) said second drive for synchronously rotating of said linear arrays of mechanically connected heliostats of said plurality of reflecting units about said second rotation axes for tracking an apparent motion of the sun in the sky.

* * * * *